(12) United States Patent
Kelly et al.

(10) Patent No.: US 10,140,602 B2
(45) Date of Patent: Nov. 27, 2018

(54) DRIVE-THRU / POINT-OF-SALE AUTOMATED TRANSACTION TECHNOLOGIES AND APPARATUS

(71) Applicants: Kevin Kelly, Decator, GA (US); Joseph Craig Kelly, Jacksonville, FL (US)

(72) Inventors: Kevin Kelly, Decator, GA (US); Joseph Craig Kelly, Jacksonville, FL (US)

(*) Notice: Subject to any disclaimer, the term of this patent is extended or adjusted under 35 U.S.C. 154(b) by 0 days.

(21) Appl. No.: 15/799,331

(22) Filed: Oct. 31, 2017

(65) Prior Publication Data

US 2018/0122022 A1 May 3, 2018

Related U.S. Application Data

(60) Provisional application No. 62/415,224, filed on Oct. 31, 2016, provisional application No. 62/464,840, filed on Feb. 28, 2017.

(51) Int. Cl.
| | |
|---|---|
| *G06Q 30/00* | (2012.01) |
| *G06Q 20/18* | (2012.01) |
| *G06Q 20/12* | (2012.01) |
| *G06Q 20/20* | (2012.01) |
| *G06Q 30/06* | (2012.01) |
| *G06Q 50/12* | (2012.01) |
| *G07F 17/00* | (2006.01) |
| *G06Q 20/32* | (2012.01) |
| *G06K 7/10* | (2006.01) |

(52) U.S. Cl.
CPC ........... *G06Q 20/18* (2013.01); *G06Q 20/12* (2013.01); *G06Q 20/202* (2013.01); *G06Q 20/208* (2013.01); *G06Q 20/327* (2013.01); *G06Q 30/0633* (2013.01); *G06Q 50/12* (2013.01); *G07F 17/0064* (2013.01); *G06K 7/10762* (2013.01)

(58) Field of Classification Search
CPC ...... G06Q 50/12; G06Q 20/12; G06Q 20/202; G06Q 30/0633
USPC .................................................. 705/15, 16
See application file for complete search history.

(56) References Cited

U.S. PATENT DOCUMENTS

| | | |
|---|---|---|
| 4,351,247 A | 9/1982 | Clark |
| 4,675,515 A | 6/1987 | Lucero |
| 5,053,868 A | 10/1991 | Higgins et al. |
| 5,168,354 A | 12/1992 | Martinez et al. |
| 5,509,071 A | 4/1996 | Petrie et al. |

(Continued)

FOREIGN PATENT DOCUMENTS

| | | |
|---|---|---|
| EP | 0607318 B1 | 5/1999 |
| WO | 2015050515 A1 | 4/2015 |
| WO | 2015114331 A1 | 8/2015 |

*Primary Examiner* — Rokib Masud
(74) *Attorney, Agent, or Firm* — Joseph P. Kincart; Rogers Towers, P.A.

(57) ABSTRACT

The present invention includes methods and apparatus for the automated provision of goods through the use of scanning systems. More specifically, the present invention provides a method for automatically conveying which goods are being ordered, where the goods will be picked up, an associated method of payment, kitchen fulfillment, item tracking, and automatic delivery by a dispenser apparatus. In preferred embodiments, the present invention is applied to the automated ordering and pick-up of food items at a fast food restaurant.

6 Claims, 36 Drawing Sheets

(56) References Cited

U.S. PATENT DOCUMENTS

| | | | |
|---|---|---|---|
| 6,003,015 A | 12/1999 | Kang et al. | |
| 6,914,582 B2 | 7/2005 | Tanaka | |
| RE42,759 E | 9/2011 | Olewicz et al. | |
| 8,181,920 B2 | 5/2012 | Brown | |
| 8,319,738 B2 | 11/2012 | Taylor | |
| 8,365,868 B2 | 2/2013 | Johnson et al. | |
| 8,583,490 B2 | 11/2013 | Klementowicz | |
| 8,626,590 B2 | 1/2014 | Istfan | |
| 8,651,324 B2 | 2/2014 | Borghi | |
| 8,886,557 B2 | 11/2014 | Shahbazi et al. | |
| 2004/0153377 A1 | 8/2004 | Dallman | |
| 2005/0154560 A1 | 7/2005 | Fitzpatrick et al. | |
| 2008/0255901 A1 | 10/2008 | Carroll et al. | |
| 2011/0173041 A1* | 7/2011 | Breitenbach | G06Q 10/06311 705/7.13 |
| 2012/0036028 A1 | 2/2012 | Webb | |
| 2012/0170728 A1 | 7/2012 | Wengrovitz et al. | |
| 2014/0089077 A1* | 3/2014 | Zuckerman | G07F 17/0064 705/14.37 |
| 2014/0358703 A1* | 12/2014 | Stuntebeck | G06Q 10/083 705/15 |
| 2015/0144653 A1* | 5/2015 | Kline | B67D 1/0888 222/1 |
| 2016/0148269 A1 | 5/2016 | LaMont | |
| 2016/0159496 A1 | 6/2016 | O'Toole | |
| 2016/0244311 A1 | 8/2016 | Burks et al. | |
| 2016/0247142 A1 | 8/2016 | Yang et al. | |

\* cited by examiner

```
┌─────────────────────────────────────────────────────────┐
│ QUERY VENDORS PROXIMATE TO A USER OR IN ROUTE VIA A     │
│                   DESIGNATED ROUTE                       │
│ 400                                                      │
└─────────────────────────────────────────────────────────┘
                            │
┌─────────────────────────────────────────────────────────┐
│                    SELECT A VENDOR                       │
│ 401                                                      │
└─────────────────────────────────────────────────────────┘
                            │
┌─────────────────────────────────────────────────────────┐
│              DESIGNATE ITEMS TO BE ORDERED               │
│ 402                                                      │
└─────────────────────────────────────────────────────────┘
                            │
┌─────────────────────────────────────────────────────────┐
│              PROCESS A PAYMENT FOR THE ORDER             │
│ 403                                                      │
└─────────────────────────────────────────────────────────┘
                            │
┌─────────────────────────────────────────────────────────┐
│         GENERATE A BARCODE (OR OTHER IDENTIFIER)         │
│ 404                                                      │
└─────────────────────────────────────────────────────────┘
                            │
┌─────────────────────────────────────────────────────────┐
│                ARRIVE TO PICK UP THE ORDER               │
│ 405                                                      │
└─────────────────────────────────────────────────────────┘
                            │
┌─────────────────────────────────────────────────────────┐
│              IDENTIFY ORDER VIA THE BARCODE              │
│ 406                                                      │
└─────────────────────────────────────────────────────────┘
                            │
┌─────────────────────────────────────────────────────────┐
│     IDENTIFY THE USER VIA THE MOBILE DEVICE OR TAG SCAN  │
│ 407                                                      │
└─────────────────────────────────────────────────────────┘
                            │
┌─────────────────────────────────────────────────────────┐
│                    PICK UP THE ORDER                     │
│ 408                                                      │
└─────────────────────────────────────────────────────────┘
```

Ordering Process at a Kiosk

1600 Optionally commence ordering process with a facial scan

1601 Allow a user to place an order at a kiosk, or on a mobile device then scan order barcode at kiosk

1602 Communicate order, identification and other data to servers/cloud and receive information back to a mobile device to constitute a barcode

1603 Issue an order to restaurant to create a logistics order in kitchen and signals to a label printer to print a barcode

1604 Prepare the order and affix the label to a tray, cup or other packaging

1605 Place order into dispenser and optionally scan barcode with a barcode scanner

1606 Communicate progress of order to customer

1607 Initiate a communication process at the dispenser where the customer presents their mobile device with barcode to scanner at the dispenser

1608 Move dispenser positions to open the pod with the order to the customer where they pick out the order

FIG. 16

License Plate Scanning and Ordering

Allow a user to drive a car through a drive-thru lane of a restaurant
1700

Scan a license plate of the car as it enters the drive-thru lane
1701

Communicate license plate image data to servers/cloud processing of the system
1702

Process image data to determine if the license plate data is associated with a user in the system
1703

Allow the user to place an order with a mobile device within the car at an outdoor kiosk
1704

Communicate order data from the kiosk to servers/cloud processing of the system
1705

Create a system order and communicate order information and a barcode to the mobile device
1706

FIG. 17

License Plate Scanning and Dispensing Apparatus

---

1800 — Allow a user to place an order via any accepted process at a restaurant that associates the order with a user 1801 — Allow a user to drive a vehicle through a drive-thru lane to a dispenser 1802 — Scan the license plate of the car 1803 — Send image data related to the license plate scan to servers/cloud and determine if the user is in the system 1804 — If the user is in the system and an order is ready for pickup at the dispenser move a related food product to a pickup location of the dispenser 1805 — Optionally send a bar code to a mobile device of the user and request the user scan the barcode to the device to authorize dispensing, in the alternative authorize the dispensing based on the license plate scan 1806 — Dispense the product to the customer of the vehicle at a dispenser

FIG. 18

Operational Flows not Involving Mobile Application Processing

---

Allow a user to approach a kiosk within a restaurant without a mobile device
1900

---

Receive an order from the user at a kiosk
1901

---

Communicate order, identification and other data to servers/cloud and receive information back to kiosk, print a receipt with a unique barcode at kiosk and distribute to user
1902

---

Issue an order to restaurant to create a logistics order in kitchen and signals to a label printer to print a barcode
1903

---

Prepare the order and affix the label to a tray, cup or other packaging
1904

---

Place order into dispenser and optionally scan barcode with a barcode scanner
1905

---

Communicate progress of order to user
1906

---

Initiate a communication process at the dispenser where the customer presents their receipt with barcode to scanner at the dispenser
1907

---

Move dispenser positions to open the pod with the order to the user where they pick out the order
1908

FIG 19

Operational Flows with Drive-thru Point of Sale Kiosk Scan

2000 — Allow a user to drive a vehicle to a restaurant without a mobile device

2001 — Allow the user to drive the vehicle through a drive-thru lane of the restaurant 2002 — Perform a scan of the license plate of the vehicle 2003 — Communicate license plate image data to servers/cloud processing of the system 2004 — Process image data to determine if the license plate data is associated with a user in the system 2005 — Allow the user to place an order without a mobile device at an outdoor kiosk by voice command or touch screen interface 2006 — Print a receipt for the order with a unique barcode and distribute to the user

FIG. 20

License Plate Scan For Dispensing Without Mobile Application Processing

Allow a user to drive a vehicle to a restaurant after placing an order by one of the means of the system
2100

Allow the user to drive the vehicle to a proximate location to a food dispenser
2101

Perform a scan of the license plate of the vehicle at the dispenser location
2102

Communicate license plate image data to servers/cloud processing of the system
2103

Process image data to determine if the license plate data is associated with a user in the system
2104

Allow the user to present a receipt with a bar code to a scanner at the dispenser
2105

Provide a food product with the dispenser after validating the barcode pattern or validating the license plate scan
2106

FIG. 21

Generation of One Time Identifiers for Shared Orders

Display menu options for a restaurant with an application on a mobile device
2110

Allow a first user to initiate a group ordering process on a mobile device
2111

Collect a number of group users and identification of users
2112

Repeat an ordering process with each group user comprising the steps of inviting the user to present an order, presenting menu options, collecting user selections if made, confirming selections with user, and informing user if others have offered to pay
2113

Communicate the status of each group order to the first user
2114

Allow the first user to complete the order process, enforcing a time limit as required
2115

Process the group order details, payment info, customer info and merchant information and generate data for a unique bar code
2116

Communicate the unique bar code information to a mobile device of the first user
2117

FIG. 21A

Remote Location Dispensing

- 2300 Optionally commence ordering process with a facial scan
- 2301 Allow a user to place an order on a mobile device and request a delivery to a remote location dispenser
- 2302 Communicate order, identification and other data to servers/cloud and notify restaurant of order request and remote dispenser request
- 2303 On approval of restaurant, issue an order to restaurant to create a logistics order in kitchen and signals to a label printer to print a barcode
- 2304 Prepare the order and affix the label to a tray, cup or other packaging
- 2305 Deliver order into dispenser and optionally scan barcode with a barcode scanner
- 2306 Communicate progress of order to customer with a unique barcode for order pick-up
- 2307 Initiate a communication process at the remote dispenser where the customer presents their mobile device with barcode to scanner at the dispenser
- 2308 Move dispenser positions to open the pod with the order to the customer where they pick out the order

FIG. 23

Remote Location Dispensing and Drone Replenishment

```
┌─────────────────────────────────────────────────────────────────┐
│       Allow a user to place an order on a mobile device and     │
│ 2400           request a delivery to a remote location dispenser│
└─────────────────────────────────────────────────────────────────┘
                                │
┌─────────────────────────────────────────────────────────────────┐
│   Communicate order, identification and other data to servers/  │
│   cloud and notify restaurant of order request and remote       │
│   dispenser request                                             │
│ 2401                                                            │
└─────────────────────────────────────────────────────────────────┘
                                │
┌─────────────────────────────────────────────────────────────────┐
│   On approval of restaurant, issue an order to restaurant to    │
│   create a logistics order in kitchen and signals to a label    │
│   printer to print a                                            │
│ 2402                    barcode                                 │
└─────────────────────────────────────────────────────────────────┘
                                │
┌─────────────────────────────────────────────────────────────────┐
│ Prepare the order and affix the label to a tray, cup or other   │
│ packaging                                                       │
│ 2403                                                            │
└─────────────────────────────────────────────────────────────────┘
                                │
┌─────────────────────────────────────────────────────────────────┐
│   Dispatch a drone to the restaurant, optionally including a    │
│ transportable pod to leave at restaurant, and allowing the      │
│ restaurant                                                      │
│ 2404   to affix the order to the drone in a transportable pod   │
└─────────────────────────────────────────────────────────────────┘
                                │
┌─────────────────────────────────────────────────────────────────┐
│    Allow restaurant staff to dispatch drone from restaurant,    │
│          and                                                    │
│ 2405 coordinate flight of drown to the chosen remote dispenser  │
└─────────────────────────────────────────────────────────────────┘
                                │
┌─────────────────────────────────────────────────────────────────┐
│   Deliver order into dispenser and transfer transportable pod   │
│   to the dispenser, optionally picking up a transportable pod   │
│   to return to home                                             │
│ 2406                    base                                    │
└─────────────────────────────────────────────────────────────────┘
                                │
┌─────────────────────────────────────────────────────────────────┐
│ Communicate progress of order to customer with a unique barcode │
│ 2407                    for order pick-up                       │
└─────────────────────────────────────────────────────────────────┘
                                │
┌─────────────────────────────────────────────────────────────────┐
│ Initiate a communication process at the remote dispenser where  │
│ the customer presents their mobile device with barcode to       │
│ scanner at the                                                  │
│ 2408                    dispenser                               │
└─────────────────────────────────────────────────────────────────┘
                                │
┌─────────────────────────────────────────────────────────────────┐
│  Move dispenser positions to open the pod with the order to the │
│            customer where they pick out the order               │
│ 2409                                                            │
└─────────────────────────────────────────────────────────────────┘
```

FIG. 24

Order with Application

| |
|---|
| 2500 Facilitate User Selection of Store or Dispenser in Application (Various Methods, i.e. proximity, on scan, on voice command, through app) |
| 2501 (Optionally) Facilitate User to Send Order Request to Other Users, Combine Request |
| 2502 Facilitate User to Select Order, Configure or Confirm Payment Options / Details |
| 2503 Ready/Queue Order |
| 2504 Coordinate with System |
| 2505 Generate Unique Barcode |
| 2506 Await Arrival at Store or Dispenser Location |
| 2507 Use License Plate/ Facial Scanner to Recognize User (Places "Go To" Automatic Order, Suggestes Favorites, Suggests Orders, Order History) |
| 2508 Facilitate Scan at Kiosk to Place order |
| 2509 (Optionally) Use Signing Key to Delete Barcode Action |
| 2510 (Optionally) Accept Payment at Kiosk if Not Paid Through Application |
| 2511 Coordinate with System and Kitchen the Order and User Details/Identification |

FIG. 25A

Remote Ordering

| | |
|---|---|
| 2700 | Receive Request from User to Select Store or Dispenser in Application (Various Methods, i.e. proximity, on scan, on voice command, through app) |
| 2701 | (Optionally) Send Order Request to Other Users, Combine Request |
| 2702 | Facilitate Selection of Order, Configure or Confirm Payment Options / Details |
| 2703 | Ready / Queue Order |
| 2704 | Coordinate with System |
| 2705 | Receive Order, Process Payment |
| 2706 | Generate Unique Barcode |
| 2707 | Coordinate with System and Kitchen the Order and User Details / Identification |
| 2708 | Fulfill Order in Kitchen |
| 2709 | (Optionally) Deliver to Dispenser by Kitchen Staff, Drone, Vendor |
| 2710 | Notify User that Order is Ready at Pick Up Location |
| 2711 | Facilitate Arrival at Store or Dispenser Location |

FIG. 27A

Remote Ordering

| 2712 | (Optionally) Recognize User With License Plate / Facial Scanner to Move Dispenser or Notify Kitchen Staff |

| 2713 | (Optionally) Perform Scan of Barcode or Identifier to Move Dispensor or Notify Kitchen Staff |

| 2714 | (Optionally) Use Signing Key to Delete Barcode Action |

| 2715 | Support User Pick Up Order at Dispenser or Pick Up Location |

| 2716 | Return and Clean Dispenser Bin |

FIG. 27B

DRIVE-THRU / POINT-OF-SALE AUTOMATED TRANSACTION TECHNOLOGIES AND APPARATUS

CROSS REFERENCE TO RELATED APPLICATIONS

This application claims the benefit of the U.S. Provisional Patent Application 62/415,224 filed Oct. 31, 2016. This application also claims the benefit of the U.S. Provisional Patent Application 62/464,840 filed Mar. 7, 2017. The contents of each are hereby incorporated in their entirety.

FIELD OF THE DISCLOSURE

The present disclosure relates to methods and apparatus for the automated provision of goods. More specifically, the present invention provides a method, through the use of scanning systems, for automatically conveying which goods are being ordered, processing the order at a point of sale location, such as a drive-thru, where the goods will be picked up when using location based mobile ordering, matching the customer to their order at a pick-up location, and an associated method of payment. In preferred embodiments, the present invention is applied to the automated ordering and pick-up of food items at a fast food restaurant.

BACKGROUND OF THE DISCLOSURE

Many situations involving the provision of goods in today's marketplace, such as the provision of fast food meals, are predicated on the ability of a customer to efficiently place an order and receive the meal (or other goods) with the correct food items in a quick and accurate manner.

Human interaction between the customer and the employee leaves room for time-costly mistakes due to either user error or misinterpretation through language barriers, speech impediments or the hard of hearing, inaudible conversation due to faulty drive-thru speakers, etc. These mistakes can lead to fewer return customers due to lower satisfaction ratings stemming from either poor customer service, processing incorrect orders, lengthy wait times, interruptions from implementing new technologies, and so on.

In addition, a point-of-sale/drive-thru transaction is limited in its ability to receive orders and deliver goods by the human factors involved, i.e. the process may only move as fast as the employee can physically work. For example, timing for processing an order is limited by how quickly the employee is able to take the customer's order, listen to the customer's order, record the order, confirm the order, prepare the order, process the payment manually, and deliver the ordered items to the customer. This process is not only taxing on both the employee and the customer, but is also costly for the fast food retailer.

Barcodes or other unique identifiers today aren't dynamic and don't change or generate specific to a customer's order. Identifiers scanned at a fast food restaurant today only link to profiles and a method of payment (scanned at checkout by an employee) only after an order has been placed. The customer still has to communicate their order within the store, at a drive-thru, or preselect a specific store online and preorder ahead of time through the restaurant's mobile application. Orders also cannot be shared, consolidated, or placed in a single, electronic process. Payments also cannot be automatically or electronically split amongst customers.

SUMMARY OF THE DISCLOSURE

Accordingly, the present invention provides automated apparatus and methods for performing an efficient transaction involving the placement of an order for goods, assembly of items ordered, confirming payment for the items and provision of the items to the customer.

The present invention, Point-of-Sale/Drive-Thru Automated Transaction Technologies (ATT) is predicated on an ordering, transacting, filing, and pick-up process at commercial fast food retailers. With the modernization of automated-technologies, ATT looks to bring a single (or minimal) step ordering process to the point-of-sale or drive-thru with limited human interaction.

The number of point-of-sale or drive-thru transactions are herein alleviated of many of the limitations resulting from the human work process, which operates unilaterally in nature. ATT addresses the aforementioned issues and provides methods and apparatus for proving faster and more accurate service to a customer and saving a fast food retailer time and money.

In some embodiments, an ATT system may be integrated with existing applications or order processing equipment, thereby leveraging and taking advantage of the existing, proprietary technologies and applications that fast food retailers may have expended significant resources developing.

Embodiments of ATT therefore provide new techniques and the use of technologies to provide automatic fast food orders (or other merchandise order), transactions, and item pick-up from either remote, onsite point-of-sale, or drive-thru locations, via a mobile device or other apparatus.

A number of fast food customers order fast food on a whim. They have predetermined meals in mind, their "go-to" so to speak; however, customers often don't have a predetermined fast food location selected. In most cases, people don't know which fast food location they will eat at. Choosing a fast food restaurant is often driven by convenience. Factors that determine a convenient method of obtaining food items include: customer control of the order, minimal wait time, order accuracy, restaurant/staff responsiveness, a relative location of a customer to a restaurant, the ability to combine multiple meals into a single order, the ability to charge separate customers for only their ordered items, and aggregate payments for combined items/orders. Customers often order on the go, when they travel, when multiple customers are in a single vehicle, and when it's most convenient. It also becomes a headache when a driver has several orders to place at a drive-thru. ATT will seek to render these inefficiencies obsolete.

Embodiments may consider a complexity of multiple orders wherein generally the more orders placed and the more complex an order, the more susceptible any given order is to mistakes from either user error or miscommunication.

The present invention also addresses the difficulty involved in splitting payments within a group of purchasers. It overcomes the difficulties of most of the fast food technologies or applications today, which require customers to preselect a restaurant, preorder a meal, and come inside to pick-up the order by, implementing scan-to-order features, allowing one or more customers to aggregate multiple meals into a single order, and combine payment for items ordered at any participating location. ATT largely renders the shortcomings and inefficiencies of present systems obsolete. ATT is adaptable to existing franchise systems, at the franchises discretion, a loyalty program or sign-in may or may not be required, such that any customer may place an order, pay, and subsequently pick-up their items all through the mobile application or with no human interaction.

One general aspect includes a system for delivery of a prepared food item, the system including: a computer server including a processor in logical communication with a digital storage storing executable code; and a transmitter in logical communication with a digital communication network. The executable code is operative with the processor to cause the server to receive from a scanner located on site of a food preparation facility an encoded barcode including a unique transaction code with encoded information including a user identification. The server may also receive an order description and a payment status portrayed upon a display of a mobile device of a user. In an example, action may be taken based upon receipt of the encoded barcode to remotely operate a dispenser, wherein the dispenser includes a plurality of bins configured for storage of food items, to dispense one or more stored food items to a user presenting the mobile device with the encoded barcode.

One general aspect includes a method for delivery of a food product, the method including receiving an order description and a payment status portrayed with a barcode upon a display of a mobile device of a user or by other means such as a printed image on a receipt. In an example, action may be taken based upon receipt of the encoded barcode to remotely operate a dispenser, wherein the dispenser includes a plurality of bins configured for storage of food items, to dispense one or more stored food items to a user presenting the mobile device with the encoded barcode. Each food item stored in a bin of the dispenser may be controlled at one of ambient temperature, less than ambient temperature and greater than ambient temperature. The method also includes configuring executable code to include a first touchscreen activated function, where the first touchscreen activated function activates a group order protocol. The method also includes receiving an activation function response from a first user. The method also includes receiving a list of a plurality of users which may participate in forming a food product order. The method also includes communicating with the plurality of users, where the communication offers an ordering session to two or more of the plurality of users. The method also includes receiving orders from two or more of the plurality of users. The method also includes communicating an order status to the first user. The method also includes placing food products in a first bin of the dispenser, where the food products include portions of the food order from the two or more of the plurality of users. The method also includes communicating a barcode image to the first user, where the barcode provides the necessary information for the user to interact with the dispenser and receive the food products of the group order. The method also includes dispensing the food products to the first user conditioned upon the first user providing the barcode image to a scanner associated with a dispenser.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 4 illustrates exemplary method steps that may be performed in some implementations of the present invention.

FIG. 16 illustrates operational flows related to order processing at a kiosk.

FIG. 17 illustrates operational flows related to license plate scanning and ordering.

FIG. 18 illustrates operational flows with license plate scanning and dispensing apparatus.

FIG. 19 illustrates operational flows not involving mobile application processing.

FIG. 20 illustrates operational flows with drive-thru point of sale kiosk scan.

FIG. 21 illustrates operational flows for license plate scanning and dispensing apparatus without mobile application processing.

FIG. 21A illustrates generation of one-time identifier for shared orders.

FIG. 23 illustrates operational flows for remote location dispensing.

FIG. 24 illustrates operational flows for remote location dispensing and drone replenishment.

FIGS. 25A-B illustrate operational flows for ordering with the application.

FIGS. 27A-B illustrate operational flows for remote ordering.

DETAILED DESCRIPTION

Figure 1:
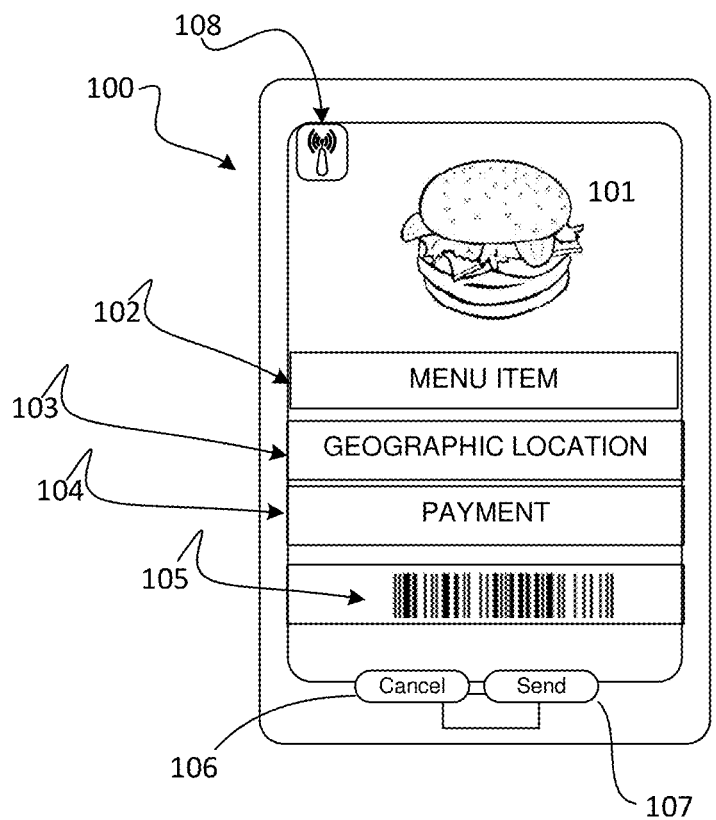
FIG. 1 illustrates an exemplary customer device according some implementations of the present invention.

The present disclosure provides generally for apparatus and methods for a customer to preselect food items for purchase, process an order through scanning systems at a point of sale or drive-thru, and subsequently pay for the order either through traditional means or through the use of scanning systems. The integrated system may also track the customer's location so that the food items are available for pick-up at a pick-up point as the customer arrives at said pick-up point. The system may automatically identify the customer through scanning systems, match the customer's order with the customer, and deliver the food items. The system may also confirm a payment mechanism and process payment for the food items that will be delivered. Options to pay upon order or pick-up are also available.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

In general, a customer that is in a vehicle has a pre-loaded mobile application in which they have the ability to pre-select a food franchise and the food items they desire to purchase. The customer is able to select items from the food provider's menu within the mobile application and proceed with submitting the order, which will produce a unique barcode or other unique identifier generated within the application. The unique barcode or identifier is populated on the user's device and combines a variety of information not limited to, order details (items, quantity, options, size, etc.), user location, store details, user profile, if multiple users are involved or share in the order, payment splitting, promotional details, custom requests, etc. The customer may also have the option to select from saved food favorites that are pre-selected and with a unique barcode or identifier, which corresponds to said food favorite, ready at the customer's fingertips. Usually these are the customer's "go-to" orders that are often purchased. A number of favorites are able to be saved and named under the user's profile. Saved favorites can also be traded or shared amongst users.

A customer can separate their orders by order numbers or profile if more than one person is included and paying for an order. Since a user's profile can be shared or stored, their favorites or "one-time" orders can also be transferred to a single user and combined into one order. A "two-way" option may be enabled, where both users may elect to participate in allowing one user to always place the other user's shared, favorite, or other specific order. A barcode is populated based on an algorithm that calculates a combination of user profile ID, order quantity, size, combo meals, sides, extras, respective unit prices, payment methods, promotions, or other details. A dynamic, unique identifier or barcode is generated for every order and is based on a software algorithm that calculates a combination of but not limited to user profile ID, order quantity, size, combo meals, sides, extras, respective unit prices, shared orders, and split payments.

A link to the customer's reward program account, reward points, or debit/credit card on file (dependent on user agreement) is also available. A user is able to link their form of payment to their purchase. This enables a quicker transaction at the point-of-sale/drive-thru and can also include the accruement of more reward points or perks such as sweepstakes, reward program coupons, double point promotions, or reward program discounts. Reward and payment integration can be added to multiple users.

Orders and payments can also be requested or shared amongst users, not just through any "friends" option within the application, but also by sending and receiving order or payment requests through phone number, email, or other means of wireless transfer of information such as Bluetooth, near field communication, etc. Once the user has finished selecting their desired order and arrives at any point-of-sale or drive-thru kiosk, the user then presents the unique barcode or unique identifier within the application to a scanning system. Upon doing so, the order is then processed and subsequently paid for if the user has opted to use such payment systems that are linked within the application (traditional payment options still apply). Such an order may be prepaid if the user has processed the ordered from the location based mobile application feature or if the user has selected to connect to the restaurant remotely. The selections and functions within the mobile application can also be controlled through voice recognition.

Throughout the document, reference may be made to a "scan" or "scanning". It is understood that the use of the word "scan" can be interpreted as varying methods to read, capture, scan, identify, decode, or process a barcode or representative image to subsequently unlock, decode, translate, transmit, or process said barcode and the information it contains.

In some embodiments, after an order has been paid for, an order number and a corresponding barcode or unique identifier are generated. Those skilled in the art will understand that the unique identifier may be generated prior to order generation without violating the spirit of the invention. If traditional order or payment methods are made, a receipt will be printed with a corresponding order number and a unique barcode or identifier for that customer's order. In some cases, the customer will once again present and scan the same unique barcode or identifier to an automatic dispenser at a pick-up location. At a pick-up location, the customer will be notified that the order is ready for pick-up, either through the mobile application, over an intercom, display, or through additional methods. An operating system that tracks the uniquely generated barcode or other unique identifier on the user's device will communicate with all systems and translate all order information to the wait and kitchen staff.

After the order is initially placed by the customer, the kitchen staff will receive a printout of the same barcode or unique identifier that is specific to and matches the customer's identifier. Such application is that the operating system can print the same unique barcode or identifier for use in item management, such as the kitchen staff placing the barcode or identifier onto the food item that will be scanned after the order is made. The wait or kitchen staff will place the barcode on one of the items in the order and proceed to scan and place the item into a storage/container bin within a mechanized apparatus or turntable, which interacts and matches the user's barcode or other unique identifier at the pick-up location. This mechanism may contain boxes or bins, which are insulated or temperature controlled, and contain designated places for drinks and other food items.

Based upon the kitchen staff scanning an item at the mechanism, the mechanism will dispense a carrier, box, or bin in which to put and store the item. When the customer is ready to pick-up their order, either inside or outside, the customer will scan their unique identifier or barcode at the pick-up point, the mechanism will match the user provided barcode or identifier to the order, and then proceed to automatically dispense the carrier, box, or bin to the customer for order pick-up.

The bins may store orders processed remotely and awaiting pick-up or order places onsite at a point-of-sale/drive-thru kiosk. Customers who preorder or order remotely can bypass the order kiosks and head directly to the pick-up point. The bins also are capable of rotating individually so that no one order is holding-up the line. When the user scans their barcode or uniquely generated identifier at an indoor or outdoor kiosk, not only is a receipt stored within the application, but an order number and the same barcode or identifier may populate. The user may then scan at the pick-up point, that corresponds to the point-of-sale or drive-thru locations. When at the pick-up point, the restaurant staff may be notified that the order is ready for pick-up when the barcode is scanned again. Although the description provided describes bins and kiosks, other automation, such as pick and place, storage trays, thermal insulated containers, mechanized belts, and the like are also within the scope of the invention to be used to store and deliver an order to a customer.

If the automatic dispenser is not used, uses of the scanning systems may also be used to identify the customer and the customer's order so that the employee may take advantage of the software to instead deliver the customer their order in lieu of the automatic dispenser and maintain a more effective and efficient customer query or queue. Remote pick-up locations may also be available, whether onsite or offsite, where the customer may elect to scan at a pick-up location disconnected from the restaurant. Upon arrival at a remote pick-up location, the customer may scan their unique barcode or identifier after the order has been processed and paid for, and a remote drone, motorized track, delivery driver, third party vendor, or other mechanism to transport a food item or food bin, is then sent to the remote location, which may dock the food bin to be dispensed to the customer, and then returned to the kitchen staff after the order is picked up or simply place the food item into a corresponding dispenser bin upon item identifier scan. Ordering and payment options are also available to the customer at a remote pick-up location or dispenser through the use of scanning systems.

In some embodiments, a vehicle license plate, tag, or other vehicular apparatus may be used as a method of identifying and/or inventorying customers. A license plate tracking system may be utilized to minimize the adaption and implementation of ATT, while also removing the system's reliance on a customer to download the application or purchase a car mounted barcode. This process can be completed by: a car approaching the drive-thru terminal or kiosk and an image scanner renders the license plate in real time, comparing the number to the fast food provider's database. If it is a first-time customer, the terminal will track the customer's purchase and save the selection to the fast food provider's server for future reference. In some embodiments, a return customer may be determined via license plate recognition and customer profile data in one or both of a mobile application and back room controller functionality. A user may also save a license plate number to the user profile, therefore associating all user preferences to the license plate number such as order favorites, automatic "go-to" orders, reward programs, payment details, and the like. When a user returns to any location of the food franchise, the drive-thru kiosk will remember the customer and tailor the options to the user based on their license plate. This can include recent orders, pending orders, suggested items, gift card balances, rewards/profile information, etc. The license plate scanner may also be used to query users, automatically order and pay for meals upon driving up to the drive-thru kiosk based on either saved selections/preferences or recently submitted orders, and also track users when they arrive at a certain pick-up point or the automatic dispenser for order pick-up identification. The automatic order feature connected with the license plate scanner also gives the user the option to instantly order their default "go-to" order upon arriving at any location or process a recently submitted order instead. Instant payment processing may be applied. The license plate scanner can also queue the user to the system and when the user is at the pick-up window, the system will match the ordered item to the customer's license plate and profile to subsequently dispense the item automatically. Traditional means of payment, such as paying with a credit card, will be done at either the order kiosk or the pick-up point if the user has not enrolled in automatic pay. An order receipt containing a unique, algorithmically generated barcode or identifier, corresponding to the user's order, may be printed for user identification purposes upon scan at an automatic dispenser. In some cases, this ensures the user doesn't need a mobile device for the scanning systems to successfully receive and dispense a user's order. Upon license plate scan and user identification, the user may confirm or edit their order at the kiosk. The system may make order suggestions at the kiosk such as recent orders, order favorites, popular orders, new items, promotions, and the like. Geofencing and the like may supplement the license plate scanner to further improve its effectiveness and efficiency.

Some implementations may include a pre-existing, pre-order application integration wherein as most fast food providers have some form of pre-paid or pre-order process in which the customer can pick-up an order, at a predestinated location, paid or unpaid for, inside the store upon arrival. The present invention may also cut down wait times and may boost sales. The current order delivery process when the customer is ready to pick-up their order not also disrupts the customer queue, but it also removes kitchen staff from preparing meals since they have to stop taking or preparing orders, find the preordered meal that was set aside, and then hand deliver these items to the customer. This is an inefficient preorder process that franchises won't be able to rely on as the user base grows under their recent mobile applications. Customers also have to plan around their schedule to go to a specific, predetermined store. In most cases, customers do not plan their fast food purchases around their schedule and at a certain location.

Fast food drive-thru purchases may be on a whim of a customer, while the customer is traveling. Pre-selecting a location when on the go or traveling can be a hassle and eliminates the freedom to drive to any desired fast food location at will, when on the go. A map feature populates nearby restaurants and in some embodiments, may render wait times at the restaurants based on the order traffic and activity measured by the operating system and scanning systems. The user can connect to the store via the map feature and place an order remotely. If a customer were to proceed with a mobile pre-order, the application will simply queue the user in the cloud, notify the user of nearby restaurants, connect the user to their restaurant of choice, provide the customer with the order's barcode and order number after the customer has selected the items and submitted their order, and the user will then present the barcode through the use of scanning systems at either the drive-thru or other point-of-sale pick-up locations. Mobile preorder applications can also include a store auto-detecting the user, either thru Bluetooth, GPS-location services, or other wireless connection options, with the user accepting to connect to either the store's indoor or drive-thru lines. Features also exist where the user can place an order and have the order processed at a qualifying store and sent to pick-up upon arrival, when the user is detected.

Additional methods of placing an order remotely or scanning onsite may include communicating via one or more of: a smart watch, an integrated home system such as Amazon Echo or Google Home, car dashboard-based applications, or other applications.

The point-of-sale and drive-thru kiosks are responsible for translating the order to the kitchen staff once the unique barcode or identifier has been scanned. Bluetooth transmittable sequence of characters can also be sent via the mobile application to the kiosks. The kiosks are touchscreen and voice recognition enabled. The drive-thru kiosk can remember the customer through license plate scanning, ask the customer upon arrival to confirm a pending order, or continue with either favorite, suggested, or new orders. Both kiosks are responsible for handling payments, either continuing with auto-pay during the order or handling traditional means of payment such as insert/slide credit card, near field communication, bill acceptor/dispenser, or other means of payment. Receipts containing a uniquely generated barcode or identifier may also be printed if the user elected to not use the app scan-to-order feature or has paid through traditional means. At any time, the customer can ask for human assistance via the kiosk.

In still other aspects, for example, if a customer is unaware of the aforementioned methods of automated transactions or doesn't opt into any of the above methods, then the customer has the ability to input or speak into a kiosk (or into an app provided on a mobile device) a user id and items ordered. A user ID may include, for example in single digits an assigned numerical or alphanumerical user ID or the customer can press or say "help," to proceed with guided human interaction or avatar interaction. These methods may be communicated to the customer/driver upon arriving at the kiosk.

Referring now to FIG. 1 a mobile device 100 is shown with an interactive user interface. The mobile device may include a wireless mechanism 108 for wirelessly communicating with another mechanism with wireless capability, such as, for example a base unit in a restaurant or other establishment engaged in commerce. The interface may include an identifier of an item 101 to be purchased. The identifier of an item 101 may include an image, an alphanumeric string, a barcode, a hash code, or other unique identifier. The mobile device 100 may also include a list 102 of choices of items that may be purchased.

In another aspect the mobile device may include a mechanism for determining a geographic location 103. The mechanism to determine a geographic location may be compared with stored data descriptive of locations of vendors from which the mobile device 100 may order items 101. A calculation may be made based upon location and a direction of travel to determine vendors proximate to the mobile device 100 from which the user may conveniently order items 101. An order may be generated and a payment mechanism 104 may be engaged to make payment for the item purchased. Processed payment may include, for example, known forms of electronic payment, including, without limitation, a process for payment involving one or more of: a credit card; a debit card, ACH system, or other mechanism.

According to the present invention, a unique identifier 105, such as a barcode or a hash code may be generated on the mobile device 100 to identify one or more of: the order, the user, items ordered, time of order, date of order and other details of the order. In some embodiments, one or more of the items described in the identifier 105, and/or the identifier itself may be transmitted via wireless transmission.

Transmission may be to a vendor or to another user. In some preferred embodiments, another user may wirelessly receive details of an order, and retransmit the order to a vendor of its choice. One or both users may also store the order and the identifier 105 for future use. Other controls may include, for example a cancel mechanism 106, a send mechanism 107, and a mechanism to access the user's profile.

Figure 2:
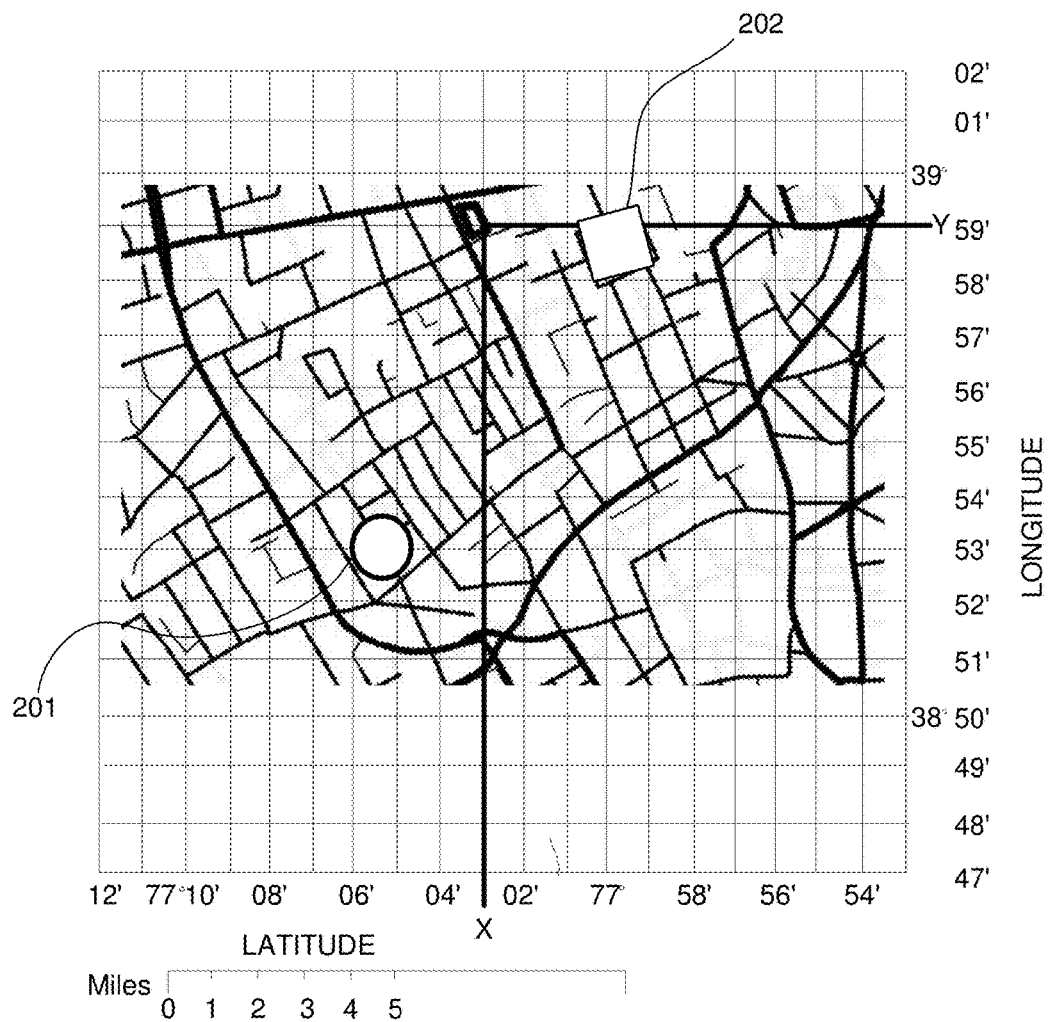
FIG. 2 illustrates a view of a customer in relation to a restaurant of choice.

Referring now to FIG. 2, in another aspect, a GPS or other geospatial locating device may calculate a location based upon a location associated with a Cartesian Coordinate, such as, for example Latitude and Longitude. A User location 201 and a vendor location 202 may be calculated and designated on a pictorial representation, such as a map. IN some preferred embodiments, a time of travel from a user location 201 to the vendor location 202 may be calculated and a time of pick-up for an order may be calculated based upon the time of travel. Wait time or status of vendor location 202 may be displayed.

Figure 3:
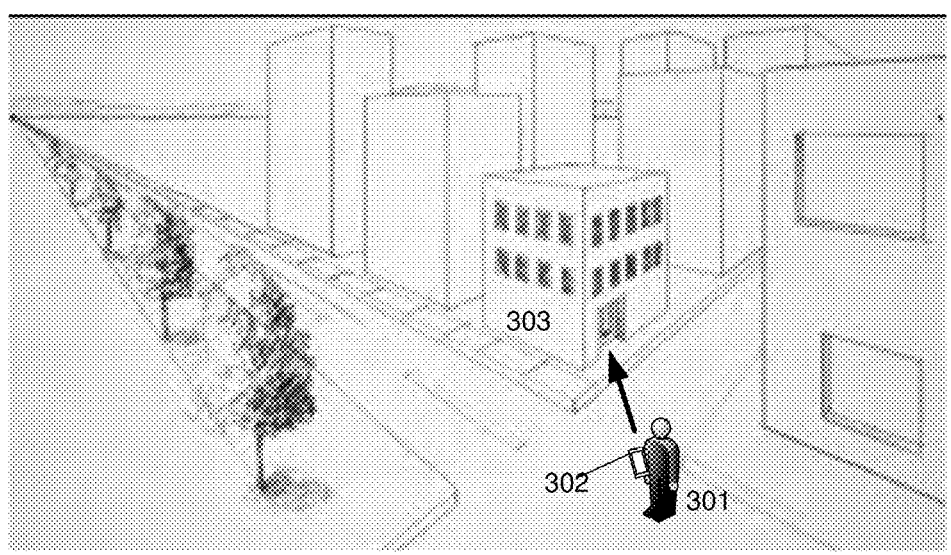
FIG. 3 illustrates an exemplary embodiment of a user with a customer device in proximity to restaurant.

Referring now to FIG. 3, in still another aspect, a User 301 walking on a street may use a handheld mobile device 302 to locate a suitable vendor 303 and place an order. The user may then walk into the vendor 303 and present a barcode to pick-up an order placed. In some specific implementations, an order may be placed while the user is on line at the vendor 303 and the order may be picked up as the line progresses with the purchase transaction already completed. Such embodiments may take advantage of the identification of the user and a purchasing history associated with the user to suggest "favored" items to order. It may also utilize the user's location information to time an order for pick-up as soon as available.

Figure 5:
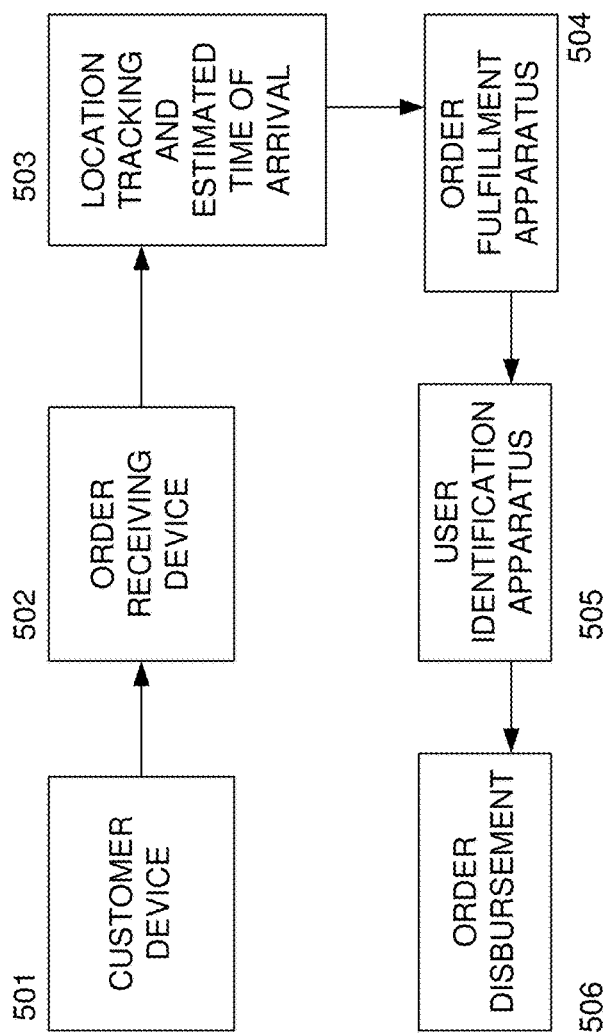
FIG. 5 illustrates a block diagram of apparatus that may be used in some implementations of the present invention.

Referring now to FIG. 4 steps 400-408 and FIG. 5 steps 501-506, method steps that may be used to implement the present invention in various embodiments. Additional aspects may include:

Barcode scanner that processes the app-derived barcode and sends it to a reciprocating terminal to process the order.

An automated voice that expresses to the customer the options of either ordering via barcode, payment options, confirming order via license plate scan, recent orders/favorites, user loyalty ID, or by stating "help" to have an employee assist with the order.

A license plate scanner that is capable of rendering a license plate in real-time to either track the customer's order history, reconcile the license plate number against a user's profile and preferences of the mobile application, place an order, or identify user at pick-up point and automatic dispenser.

Technology/operating system for the receiving terminal that is responsible for processing, pricing, and delivering the order to the fast food employee.

In some embodiments, an automated customer Identifier may be combined with designated items to order contained in a customer Profile. The automated customer Identifier may include for example a license plate (or another vehicle identifier, such as a barcode sticker). An automated scanner may scan the vehicle and generate a default "go-to" order associated with the customer identified via the scan. The customer may have the option to modify the order, such as for example, to change the items ordered or to change payment options. The customer may also transmit a preference for inside or drive-thru pick-up of the order. As the customer arrives at a designated pick-up location, at license plate scan may be used to process payment and deliver items ordered.

In additional embodiments, a customer may arrive at a drive-thru kiosk and be identified via an automated scan. Based upon the automated scan, the customer may be presented with an interactive interface that includes customer specific favorites, suggested items, and prior orders. The User operates the interactive interface to place an order.

Payment may be made up front, upon arrival or based upon actual pick-up of the ordered items.

As described herein, aspects of automated: ordering, identification of a customer, payment and pick-up are discussed within the context of prepared food items and restaurants. Those skilled in the art will understand that similar processes and automation may be implemented for items other than prepared food items and may therefore include one or more of: groceries, pharmacy items, dry goods, or other items of commerce.

Figure 6:
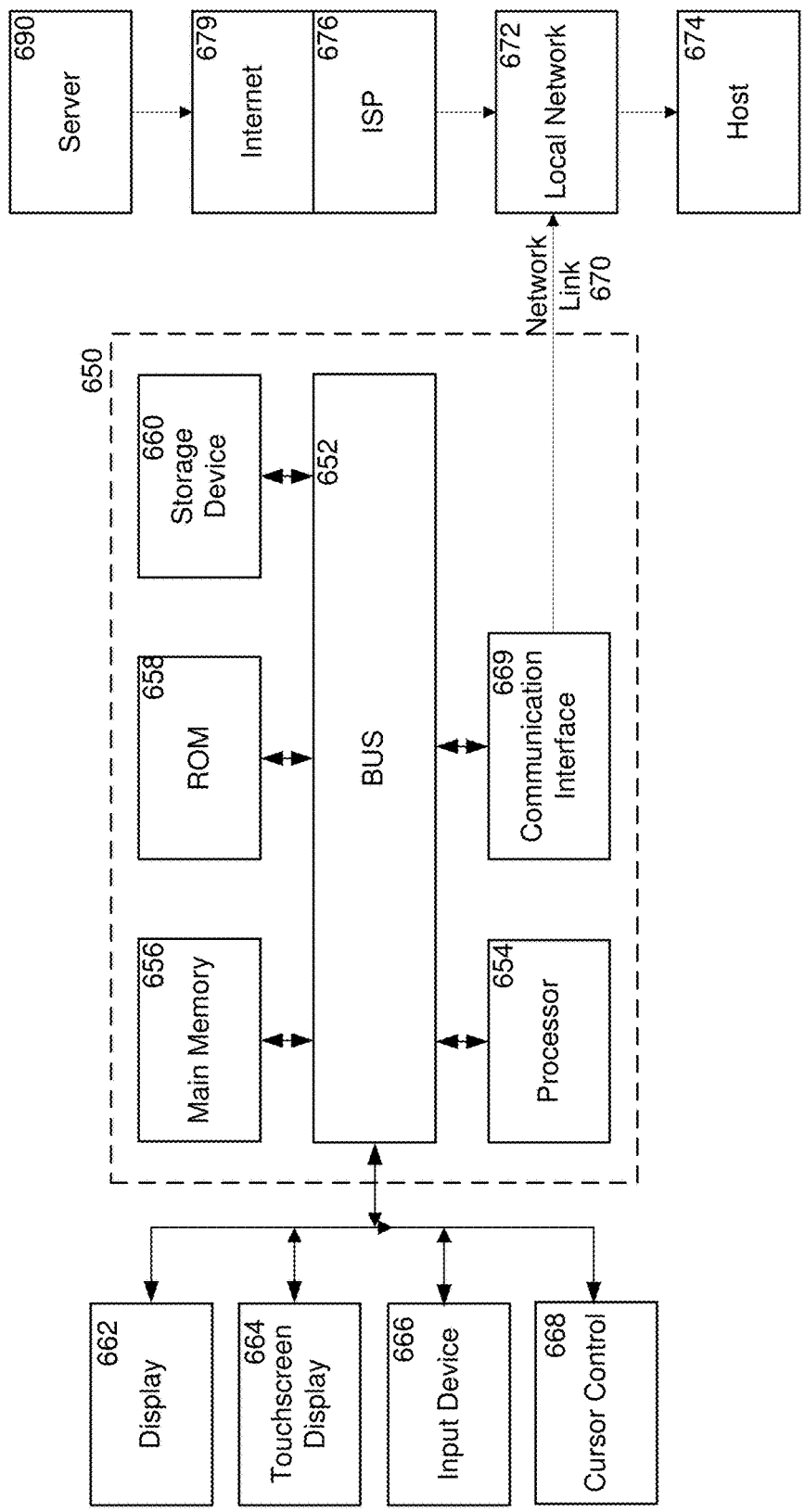
FIG. 6 illustrates aspects of controller hardware useful for implementing the present invention as a block diagram.

Referring now to FIG. 6, additional aspects of printer controller hardware useful for implementing the present invention are illustrated as a block diagram that includes a controller 650 upon which an embodiment of the invention may be implemented. Controller 650 includes a bus 652 or other communication mechanism for communicating information, and a processor 654 coupled with bus 652 for processing information.

In still other aspects, such as, for example, if a customer is unaware of the aforementioned methods of automated transactions or doesn't opt into any of the above methods, then the customer has the ability to input or speak into a terminal (or into a app provided on a mobile device) a user id and items ordered. A user ID may include, for example in single digits an assigned numerical or alphanumerical user ID or the customer can press or say "help," to proceed with guided human interaction or avatar interaction. These methods may be communicated to the customer/driver upon arriving at the terminal. Some implementations may also include a barcode scanner and barcode generation. Preferred embodiments include a barcode generated on a customer mobile device. Mobile application that converts the fast food order to a barcode or other machine-readable device, such as a hash or Bluetooth transmittable sequence of characters. A terminal or receiver that has the below capabilities:

Controller 650 also includes a main memory 656, such as a random-access memory (RAM) or other dynamic storage device, coupled to bus 652 for storing information and instructions to be executed by processor 654. Main memory 656 may also be used for storing temporary variables or other intermediate information during execution of instructions to be executed by processor 654. Controller 650 further includes a read only memory (ROM) 658 or other static storage device 660.

Controller 650 may be coupled via bus 652 to a display 662, such as a cathode ray tube (CRT), liquid crystal display (LCD), plasma display panel (PDP), organic light-emitting diode (OLED), projector, or heads up display for displaying information to a computer user. An input device 666, including alphanumeric and other keys, may be coupled to bus 652 for communicating information and command selections to processor 654. Another type of user input device is cursor control 668, such as a mouse, a trackball, a touchpad, or cursor direction keys for communicating direction information and command selections to processor 654 and for controlling cursor movement on display 662. Another type of user input device is a touchscreen display 664 where a user may communicate information and command selections to processor 654 by tactile interaction with the display thereby controlling cursor movement or alphanumeric and other keys. This input device typically has two degrees of freedom in two axes, a first axis (e.g., x) and a second axis (e.g., y), that allows the device to specify positions in a plane.

Embodiments of the invention are related to the use of controller 650 for setting operational parameters relating to digital messaging and game playing. According to some embodiment of the invention, layering system parameters are defined and managed by controller 650 in response to processor 654 executing one or more sequences of one or more instructions contained in main memory 656. Such instructions may be read into main memory 656 from another computer-readable medium, such as storage device 660. Execution of the sequences of instructions contained in main memory 656 causes processor 654 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 654 for execution. Such a medium may take many forms, including but not limited to, non-volatile media, volatile media, and transmission media. Non-volatile media includes, for example, optical or magnetic disks, such as storage device 660 and 658. Volatile media includes dynamic memory, such as main memory 656. Transmission media includes coaxial cables, copper wire and fiber optics, including the wires that comprise bus 652. Transmission media may also take the form of acoustic or light waves, such as those generated during radio wave and infrared data communications.

Common forms of computer-readable media include, for example, a memory stick, hard disk or any other magnetic medium, a CD-ROM, any other optical medium, a RAM, a PROM, and EEPROM, any other memory chip or cartridge, or any other medium from which a computer may read.

Various forms of computer readable media may be involved in carrying one or more sequences of one or more instructions to processor 654 for execution. For example, the instructions may initially be carried on a magnetic disk of a remote computer. The remote computer can load the instructions into its dynamic memory and send the instructions over a distributed network such as the Internet. A communication device may receive the data on the telephone line, cable line, or fiber-optic line and use an infrared transmitter to convert the data to an infrared signal. An infrared detector can receive the data carried in the infrared signal and appropriate circuitry can place the data on bus 652. Bus 652 carries the data to main memory 656, from which processor 654 retrieves and executes the instructions. The instructions received by main memory 656 may optionally be stored on storage device 660 either before or after execution by processor 654.

Controller 650 also includes a communication interface 669 coupled to bus 652. Communication interface 669 provides a two-way data communication coupling to a network link 670 that may be connected to a local network 672. For example, communication interface 669 may operate according to the internet protocol. As another example, communication interface 669 may be a local area network (LAN) card allowing a data communication connection to a compatible LAN. Wireless links may also be implemented.

Network link 670 typically provides data communication through one or more networks to other data devices. For example, network link 670 provides a connection through local network 672 to a host computer 674 or to data equipment operated by an Internet Service Provider (ISP) 676. ISP 676 in turn provides data communication services through the worldwide packet data communication network now commonly referred to as the "Internet" 679. Local network 672 and Internet 679 both use electrical, electromagnetic, or optical signals that carry digital data streams.

The signals through the various networks and the signals on the network link 670 and through communication interface 669, which carry the digital data to and from controller 650 are exemplary forms of carrier waves transporting the information.

In some embodiments, Controller 650 may send messages and receive data, including program code, through the network(s), network link 670 and communication interface 669. In the Internet example, a server 690 might transmit a requested code for an application program through Internet 679, ISP 676, local network 672 and communication interface 669.

Processor 654 may execute the received code as it is received, and/or stored in storage device 660, or other non-volatile storage for later execution. In this manner, controller 650 may obtain application code in the form of a carrier wave.

Access devices may include any device capable of interacting with controller or other service provider. Some exemplary devices may include a mobile phone, a smart phone, a tablet, a netbook, a notebook computer, a laptop computer, a wearable computing or electronic device, a terminal, a kiosk, or other type of automated apparatus. Additional exemplary devices may include any device with a processor executing programmable commands to accomplish the steps described herein.

A controller may be a programmable board such as an Arduino board, and/or one or more of: personal computers, laptops, pad devices, mobile phone devices and workstations located locally or at remote locations, but in communication with the system. System apparatus can include digital electronic circuitry included within computer hardware, firmware, software, or in combinations thereof. Additionally, aspects of the invention can be implemented manually.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The present invention may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired, and in any case, the language can be a compiled or interpreted language. Suitable processors include, by way of example, both general and special purpose microprocessors.

Generally, a processor will receive instructions and data from a read-only memory and/or a random-access memory. Generally, a computer will include one or more mass storage devices for storing data files; such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EEPROM and flash memory devices; magnetic disks such as, internal hard disks and removable disks; and CD ROM disks. Any of the foregoing can be supplemented by, or incorporated in, ASICs (application-specific integrated circuits).

In some embodiments, implementation of the features of the present invention is accomplished via digital computer utilizing uniquely defined controlling logic, wherein the controller includes an integrated network between and among the various participants in Process Instruments.

The specific hardware configuration used is not particularly critical, as long as the processing power is adequate in terms of memory, information updating, order execution, redemption and issuance. Any number of commercially available database engines may allow for substantial account coverage and expansion. The controlling logic may use a language and compiler consistent with that on a CPU included in the medical device. These selections will be set according to per se well-known conventions in the software community.

Figure 7:
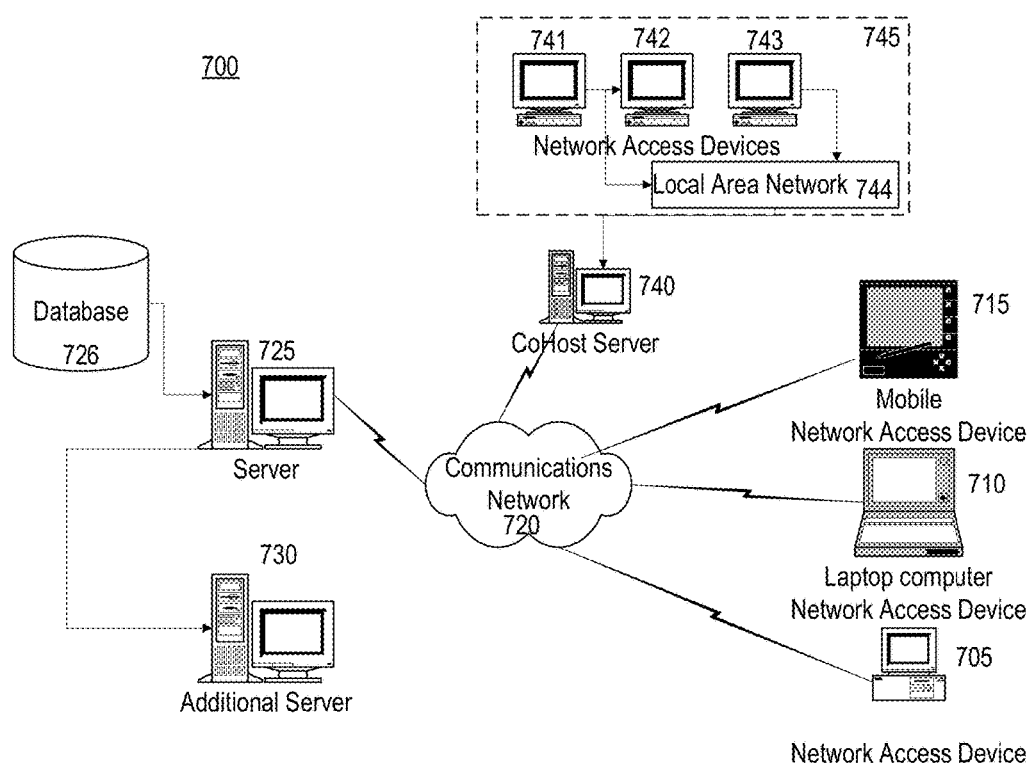
FIG. 7 illustrates an exemplary processing and interface system.

Referring now to FIG. 7, an exemplary processing and interface system 700 is illustrated. In some aspects, access devices 715, 710, 705, such as a mobile device 715 or laptop computer 710 may be able to communicate with an external server 725 though a communications network 720. The external server 725 may be in logical communication with a database 726, which may comprise data related to identification information and associated profile information. In some examples, the server 725 may be in logical communication with an additional server 730, which may comprise supplemental processing capabilities.

In some aspects, the server 725 and access devices 705, 710, 715 may be able to communicate with a cohost server 740 through a communications network 720. The cohost server 740 may be in logical communication with an internal network 745 comprising network access devices 741, 742, 743 and a local area network 744. For example, the cohost server 740 may comprise a payment service, such as PayPal or a social network, such as Facebook or a dating web site.

Figure 8:
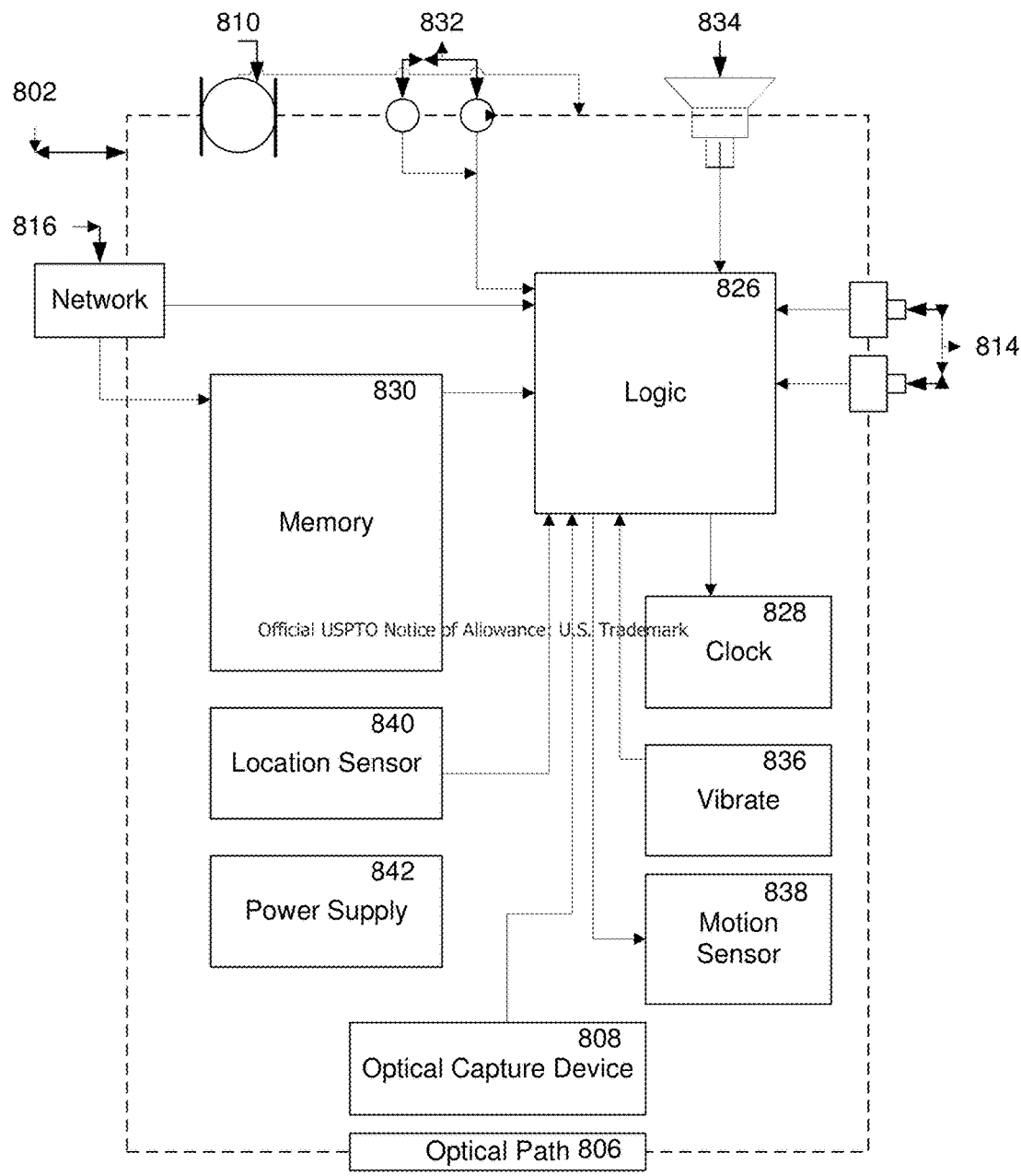
FIG. 8 illustrates a block diagram of an exemplary embodiment of a mobile device.

Referring now to FIG. 8, a block diagram of an exemplary embodiment of a mobile device 802 is illustrated. The mobile device 802 may comprise an optical capture device 808, which may capture an image and convert it to machine-compatible data, and an optical path 806, typically a lens, an aperture, or an image conduit to convey the image from the rendered document to the optical capture device 808. The optical capture device 808 may incorporate a Charge-Coupled Device (CCD), a Complementary Metal Oxide Semiconductor (CMOS) imaging device, or an optical sensor of another type.

In some embodiments, the mobile device 802 may comprise a microphone 810, wherein the microphone 810 and associated circuitry may convert the sound of the environment, including spoken words, into machine-compatible signals. Input facilities 814 may exist in the form of buttons, scroll-wheels, or other tactile sensors such as touch-pads. In some embodiments, input facilities 814 may include a touchscreen display. Visual feedback 832 to the user may occur through a visual display, touchscreen display, or indicator lights. Audible feedback 834 may be transmitted through a loudspeaker or other audio transducer. Tactile feedback may be provided through a vibration module 836.

In some aspects, the mobile device 802 may comprise a motion sensor 838, wherein the motion sensor 838 and associated circuitry may convert the motion of the mobile device 802 into machine-compatible signals. For example, the motion sensor 838 may comprise an accelerometer, which may be used to sense measurable physical acceleration, orientation, vibration, and other movements. In some embodiments, the motion sensor 838 may comprise a gyroscope or other device to sense different motions.

In some implementations, the mobile device 802 may comprise a location sensor 840, wherein the location sensor 840 and associated circuitry may be used to determine the location of the device. The location sensor 840 may detect Global Position System (GPS) radio signals from satellites or may also use assisted GPS where the mobile device may use a cellular network to decrease the time necessary to determine location. In some embodiments, the location sensor 840 may use radio waves to determine the distance from known radio sources such as cellular towers to determine the location of the mobile device 802. In some embodiments these radio signals may be used in addition to and/or in conjunction with GPS.

In some aspects, the mobile device 802 may comprise a logic module 826, which may place the components of the mobile device 802 into electrical and logical communication. The electrical and logical communication may allow the components to interact. Accordingly, in some embodiments, the received signals from the components may be processed into different formats and/or interpretations to allow for the logical communication. The logic module 826 may be operable to read and write data and program instructions stored in associated storage 830, such as RAM, ROM, flash, or other suitable memory. In some aspects, the logic module 826 may read a time signal from the clock unit 828. In some embodiments, the mobile device 802 may comprise an on-board power supply 842. In some embodiments, the mobile device 802 may be powered from a tethered connection to another device, such as a Universal Serial Bus (USB) connection.

In some implementations, the mobile device 802 may comprise a network interface 816, which may allow the mobile device 802 to communicate and/or receive data to a network and/or an associated computing device. The network interface 816 may provide two-way data communication. For example, the network interface 816 may operate according to an internet protocol. As another example, the network interface 816 may comprise a local area network (LAN) card, which may allow a data communication connection to a compatible LAN. As another example, the network interface 816 may comprise a cellular antenna and associated circuitry, which may allow the mobile device to communicate over standard wireless data communication networks. In some implementations, the network interface 816 may comprise a Universal Serial Bus (USB) to supply power or transmit data. In some embodiments, other wireless links known to those skilled in the art may also be implemented.

As an illustrative example of a mobile device 802, a reader may scan some text from a newspaper article with mobile device 802. The text is scanned as a bit-mapped image via the optical capture device 808. Logic 826 causes the bit-mapped image to be stored in memory 830 with an associated time-stamp read from the clock unit 828. Logic 826 may also perform optical character recognition (OCR) or other post-scan processing on the bit-mapped image to convert it to text. Logic 826 may optionally extract a signature from the image, for example by performing a convolution-like process to locate repeating occurrences of characters, symbols, or objects, and determine the distance or number of other characters, symbols, or objects between these repeated elements. The reader may then upload the bit-mapped image (or text or other signature, if post-scan processing has been performed by logic 826) to an associated computer via network interface 816.

As an example of another use of mobile device 802, a reader may capture some text from an article as an audio file by using microphone 810 as an acoustic capture port. Logic 826 causes audio file to be stored in memory 830. Logic 826 may also perform voice recognition or other post-scan processing on the audio file to convert it to text. As above, the reader may then upload the audio file (or text produced by post-scan processing performed by logic 826) to an associated computer via network interface 816.

Dispensing Apparatus

Figure 9A:
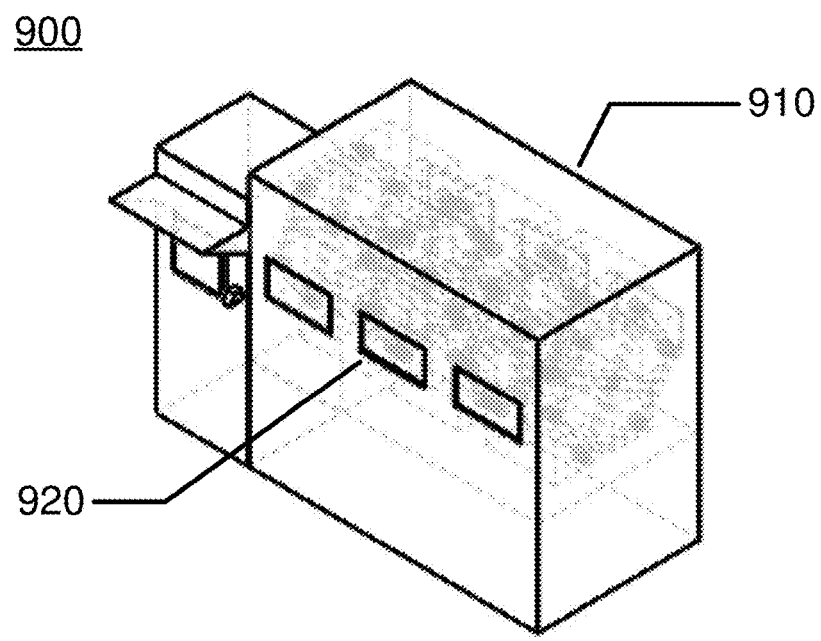
FIGS. 9A-9I illustrate different views of an exemplary dispensing apparatus.
Figure 9B:
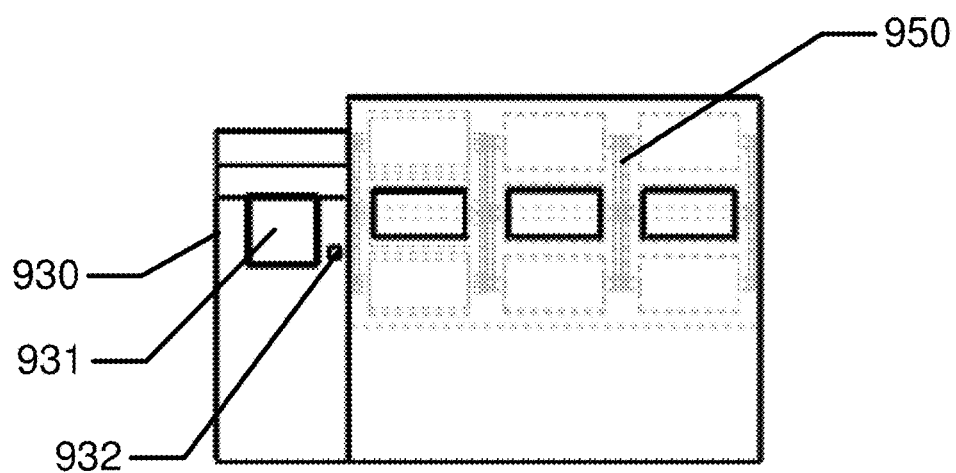
Figure 9C:
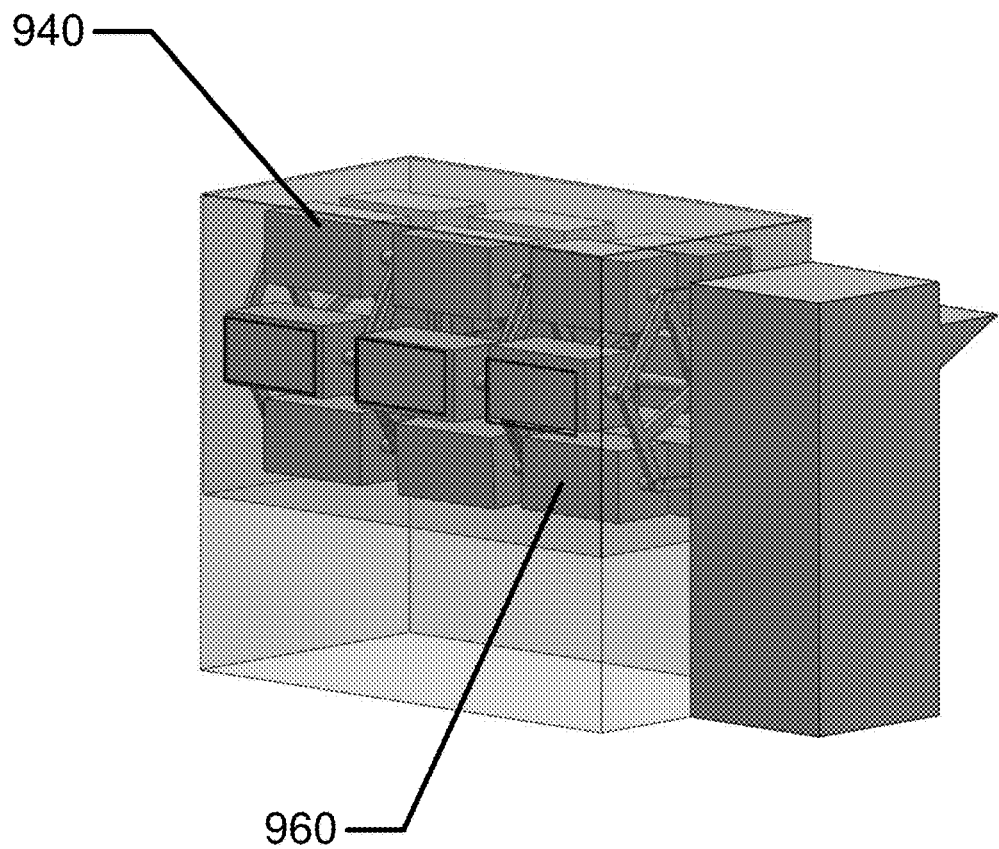

An integral part of the concepts disclosed herein relates to method and apparatus to improve accuracy and effectiveness of fast food restaurant order realization. One of the final steps in order realization is the delivery of prepared food to the customer. Novel apparatus for dispensing may interact with computer systems and servers that organize a variety of operational aspects of food order realization. Referring now to FIG. 9A, FIG. 9B, and FIG. 9C, multiple views of an exemplary dispenser 900 are illustrated. In some examples, a dispenser 900 may be located interior or exterior to a fast food restaurant, with access ports in the rear 910 for employee access to place prepared food. Access ports in the front 920, may function for consumer access to prepared food. In some operational flows, an order is received, a restaurant employee, prepares the order and another restaurant employee places the prepared order into the dispenser. In some examples, a display screen with scanner may be located on both sides of the dispenser so that restaurant staff may control the dispenser and scan food products as they are placed into the dispenser. In some examples, a dispenser may be connected with a license plate scanner and have the ability to dispense items upon a recognized license place scan. In some examples, a license plate scan may be supplemented with biometric data of the occupants, mobile device communication of mobile devices of the occupants or other supplemental information.

In some examples, a dispenser that is located on the exterior of a restaurant may include a user interface 930, with which a consumer may interact for order pick-up and other functions. The user interface 930 may comprise a screen 931, for displaying instructions and information to the consumer. In some embodiments, this screen may be voice activated or feature a touch screen, allowing the consumer to interact with icons and buttons displayed on the screen. In other possible embodiments, this screen may merely display information for the user, who interacts with an application on their mobile device.

Multiple other embodiments and user interface schemes may be possible, with multiple interface methods having importance to allow different users to interact with the dispenser 900 in their preferred method. The user interface may include connections to the internet or to a private network of the restaurant as well as wireless interface connections for various standards include WiFi, Cellular, Near Field Communication, Bluetooth, ZigBee, RFID, and the like. The user interface 930 may also comprise a scanner 932, to scan barcodes, QR codes, or other user-specific codes generated by the application system, for ordering or pick-up purposes. This code may be integral to identify a user who has arrived at the dispenser 900, identify a user's order, or many other significant identifying information that may be important to ensure that a consumer receives their order.

In some examples, the user interface 930 may be located adjacent to the front access ports 920, as shown in FIG. 9B, or separate from the front access ports 920. In some embodiments, the user interface 930 may also be used for placing an order, for consumers who do not wish to use the mobile app ahead of time to place an order, or do not possess a mobile device with which to place an order. In other examples, the customer may typically place an order with a mobile device or at a kiosk. Different operational flows will be discussed in more detail following.

Referring to FIG. 9C, inside the dispenser 900, multiple food conveyance and conditioning pods 940 may be seen. Each of these food conveyance and conditioning pods 940 may be located on a movement apparatus 950 (in FIG. 9B) that changes their location within the dispenser 900. A location change may be important to move a specific food conveyance and conditioning pod 940 to a rear access port 910, front access port 920, or to a possible storage location 960 within the dispenser 900.

Food conveyance and conditioning pods 940 may be tuned to heat or cool the food placed within to a desired temperature, to maintain optimal consumption conditions while they wait in a storage location 960 for pick-up by a consumer. In FIG. 9B, a "Ferris Wheel" type movement apparatus 950 may be seen; this non-limiting movement apparatus 950 example may distribute food conveyance and conditioning pods 940 among front access ports 920, rear access ports 920, and storage locations 960. Such an example, may simultaneously maintain an upright position of the food conveyance and conditioning pod 940 so as to prevent food or beverages from spilling while being moved. In some examples, the pods may have active elements within them that keep the pod upright. For example, gyroscopic elements may be used. In other examples, active devices can monitor the orientation of the pod and make adjustments to weights within the base of the pod to stabilize the pod to a fixed orientation.

Other movement apparatus 950 types may be possible, such as sliding mechanisms that translate, rather than rotate the food conveyance and conditioning pods 940 to different locations within the dispenser 900, as a non-limiting example. Numerous means to create a storage location for food that may be accessed by restaurant personnel for placement of food, that may maintain environments surrounding the food during its storage, and that may dispense the food to a user when control conditions indicate a condition to dispense the food.

Figure 9D:
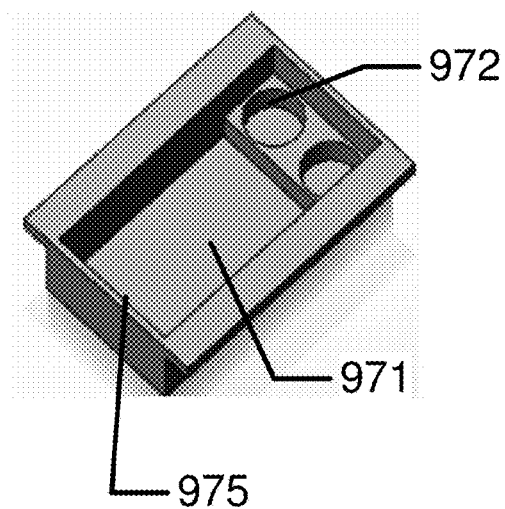
Figure 9E:
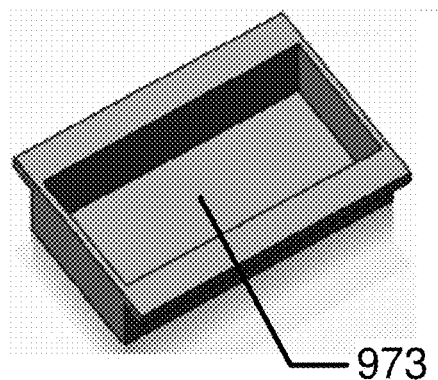
Figure 9F:
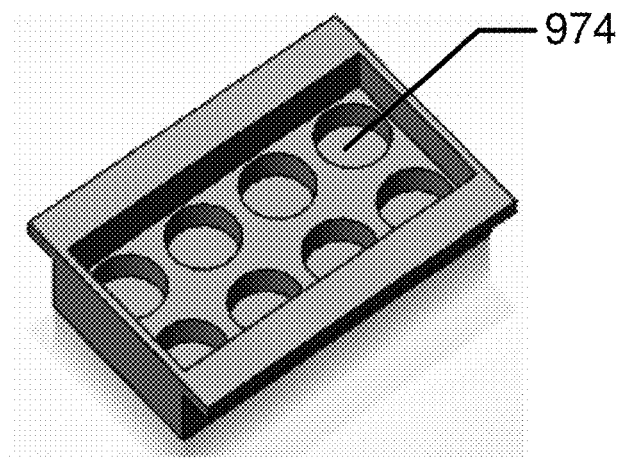

Referring now to FIG. 9D, FIG. 9E, and FIG. 9F, several examples of a food distribution tray may be seen. FIG. 9D may represent a possible standard food distribution tray possessing both a food (or solid and packaged goods) area 971 and beverage (or liquid goods) holders 972. Bags or other possible packaging for food may be placed in the food area 971 of the distribution tray raised sides 975 of the food area 971 of the distribution tray may keep the food from falling out of the tray when it is placed inside of the food conveyance and conditioning pods 940. If a consumer is removing the distribution tray from the food conveyance and conditioning pod 940 to acquire it, or at other points in the process between cooking and consuming the food, there may be jostling actions, shaking, jolting and the like which may dislodge stored products if there is not a sufficient height of the raised sides 975. In some examples, the food distribution tray may have a standard location upon which barcode labels may be affixed. In some other examples, food distribution trays may also include imbedded RFID devices or other devices for tracking and identification.

In an important embodiment, the food products are contained within fixtures within a bin of a dispenser where the fixtures are maintained within the bin when the customer removes their food. Thus, cup holders and food product bins may be opened to the customer where the customer may reach into the bin and remove cups and packages of food without removing the storage fixtures from the bin. Thus, in some embodiments there may be no paper or metal tray utilized to dispense food products to a user.

Similarly, raised sides of the cup holder 972 of the distribution tray may keep drinks from falling out of the distribution tray or falling over inside of the distribution tray when being placed inside of the food conveyance and conditioning pods 940, when a consumer is removing the distribution tray from the food conveyance and conditioning pod 940 to acquire the beverage and/or other items, or at other points in the process between the pouring of and consuming of the beverage, where it may be jostled or otherwise inclined to fall. If an order contains just food or just beverages, an employee may use a distribution tray optimized for food 973 (FIG. 9E) or a distribution tray optimized for beverages 974 (FIG. 9F), respectively.

Figure 9G:
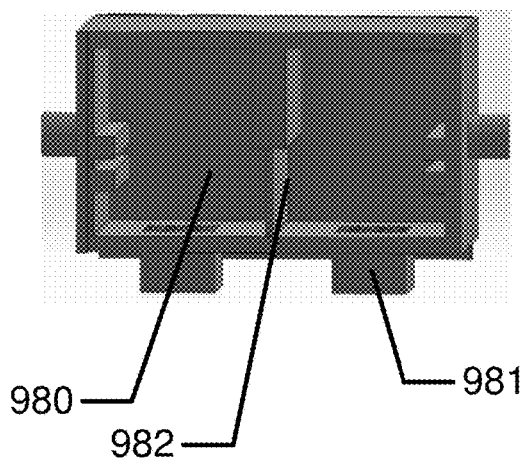
Figure 9H:
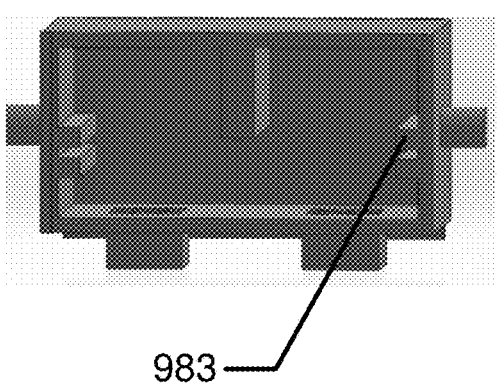
Figure 9I:
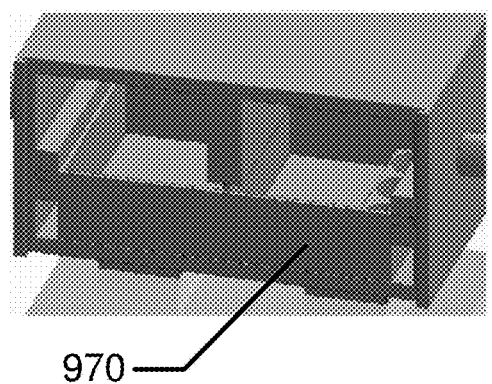

Referring now to FIG. 9G, FIG. 9H, and FIG. 9I, examples of food conveyance and conditioning pods 940 may be seen. Multiple views of this exemplary food conveyance and conditioning pod 940 are shown to demonstrate an embodiment of separable food conditioning areas 980. In this example of a food conveyance and conditioning pod 940, the storage location may be accessed from both the front and the rear of the unit as illustrated. Thus, by opening a set of front doors (shown removed in FIGS. 9G-9I) access may be granted from a single front access port 920. Alternatively, opening doors in the rear of the unit may allow access from a rear access port 920. In some examples each of the front and rear sides of the food conveyance and conditioning pod 940 may have two separate doors for access to a left or right side. The doors of a bin may slide open to grant access to a user when the user is identified with a specific identifier, a barcode receipt, or a mobile device based barcode or other means of identification. The doors may include composite doors that open the outside environment to the inside of the dispenser, and each bin may have a set of doors which keep the heated and cooled environments controlled. These bid doors may be opened by the user or may automatically open on a verified identification being presented.

There may be two separate food conditioning areas 980 which exist inside a single pod, with individually condition control hardware 981. Thus, in some examples, the environment of the left side portion of the pod may be maintained at a refrigerated condition while the environment of the right-side portion of the pod may be maintained at a heated condition.

In some examples, the separation between the left and right sides of the pod may be achieved by a movable partition door 982, shown in a closed position in FIG. 9G and an open position in FIG. 9H. In some examples, the condition control hardware may comprise fans and thermoelectric heating and cooling modules along with a system controller which may interface with thermocouples or other temperature measuring devices located within the pod. Any heating and cooling systems which may interface with a moving pod may be utilized. In the example mentioned, thermoelectric temperature control modules may either heat or cool the region under the control of electrical flow with minimal vibration, and flow of chemicals and the like. The bins may include insulation to keep thermal environments stable. In some examples, vacuum vessels may be utilized for insulation where a metallic bin component on the inside and a corresponding piece on the outside are welded to thin interface components which keep an inside metallic part predominantly separated from a corresponding metal external piece, where the space between may be evacuated in some examples for good insulating properties.

Referring to FIGS. 9G and 9H, the partition door 982 may move to its open position, as shown in FIG. 9H, to allow a distribution tray to be slid into the food conveyance and conditioning pod 940. The distribution tray may include flanges on its side which may slid into mating slots 983 of the pod. Once a distribution tray is fully situated within the food conveyance and conditioning pod 940, the partition door 982 may move back down to its closed position. Locks may secure the tray in place so that it may not be removed without a proper unlocking device. Pressure sensing hardware may be coordinated with the partition door 982 to ensure that it does not push against any obstacles (food or otherwise) while descending to its closed position. This may prevent the accidental crushing of food or other items, which may be undesirable for the consumer.

In the case where there is an interference of the intermediate door, an employee may be warned of its happening, and prompted to adjust the food or otherwise remove the blockage inside of the food conveyance and conditioning pod 940. The profile of the partition door 982 may have a close fit to the distribution tray allowing the partition door 982 to close down on the distribution tray with minimal resistance or friction, yet to achieve as much of a thermal insulating barrier between the two separate food conditioning areas 980 as possible. This fit may also achieve further stabilization of the distribution tray within the food conveyance and conditioning pod 940 as it is moved around for storage and distribution.

When the food is ready for pick-up, the food conveyance and conditioning pod 940 may open at the front access port 920, and the partition door 982 may move to its open position. This frees the distribution tray to be grasped by a consumer and slid out of the food conveyance and conditioning pod 940. In some examples, the illustrated trays may reside with the bin and provide supportive surfaces to store the food in, where a user will reach into the bin and remove the food products from the bin trays without removing a tray. In some embodiments, separate smaller distribution trays may be placed in each of the separate food conditioning areas 980, or a single smaller distribution tray may be placed in a single food conditioning area 980. In some embodiments, both separate food conditioning areas 980 may be heated to maintain the condition of hot food or other heated items; alternatively, both separate food conditioning areas 980 may be cooled to maintain the condition of cooled beverages, ice creams or other cooled items. As the third possibility already mentioned, one of the separated food conditioning areas 980 may be cooled, while the other is heated.

There may be numerous sensors to monitor temperature, humidity, gas composition and the like. Other sensors may monitor the presence of food products and trays within the device. In some examples, cameras may be located within the pods to allow for remote viewing of the status within the pod. Other examples of sensors may include weight detecting pads or devices located within the bin that can identify when an item is placed or removed from a bin. The resulting signal can support the closing of the bin/pod.

In other examples, a weight range sensor may be used that may identify an approximate weight range of an order placed into a bin. This weight may be compared to a range of weights that may be expected for a particular order. Variation outside of an expected weight range may signify to the kitchen staff a potential with a paired order.

An RFID tracker or other proximity device may be tagged, labeled, placed, or stuck-on an order. In some examples, the device or tracker can be paired or assigned to a bin or dispenser. When the tracker or device is removed along with the order, the bin or dispenser may recognize its removal and close the bin/pod paired when a tracker device is observed to be removed. In a similar manner, laser scanning apparatus may also be used to determine when an item has been removed from its corresponding/paired bin or when the bin contains its order.

In some examples, the application may provide the user with a variety of control options that may be user selectable. For example, a user may request a target time for the placement of food into a food storage bin. In some examples, a GPS based positioning signal of a user may be utilized to determine their proximity and estimated arrival time at a dispense where such an estimate could be used to implement the targeting for placement of food or for heating hot food products shortly before an expected arrival of a user. The location determination may utilize geopositioning/geofencing techniques based on GPS receivers, cell phone location based on cell/repeater location capabilities, or any other technique that supports a determination of a user's location.

In some other examples, the user may choose a customized temperature and/or humidity that a user can request while their food is stored. In some specialized pods, there may be special equipment such as the ability to invoke a microwave function of the specialized pods. Users may request a pod with a microwave and may set a particular setpoint for microwaving their product when they pick-up the order. In some examples, a pod may comprise heat lamps. Hereto, the user may set particular set points for the heat lamp including when to turn on the heat lamp, when to turn off the heat lamp, and what level to set the heat lamp. In some other examples, pods may have specialized features to introduce aromas into the packaging of the stored food upon pick-up. Like the other specialized functions, the user may have optional control over the type of aroma, and quantity of aroma to distribute upon their packaging as the order is picked up.

The interior of the pods may be subject to numerous events that may create a dirty condition. Therefore, in some examples, the internal components may be shielded by covers which may be removable for thorough cleaning. In some other examples, the covers may be formed of removable material which may be disposable. So, a removable portion may be removed and replaced at a frequency while the underlying surfaces may be cleaned between the placement of the removable covers. In other examples, the components may be sufficiently encapsulated so that the entire bin may be washed with vigorous washing flows. In some examples a pod washing apparatus may be located within the base of the dispenser and it may be able to engage a pod while it is stored in the lowest condition. The front and rear doors of the pod may be opened, after checking that the pod is empty. The cleaning unit may interface with the pod to clean, and/or sterilize and/or dry it.

In some examples, a user may connect to a dispenser in route. The choice for which dispenser to connect to may be determined by a variety of influences which may include the path of destination, time duration, selecting a store associated with a dispenser, application integration (i.e. google maps), proximity to current location, or its location near certain destinations.

Application Flow.

Figure 10:
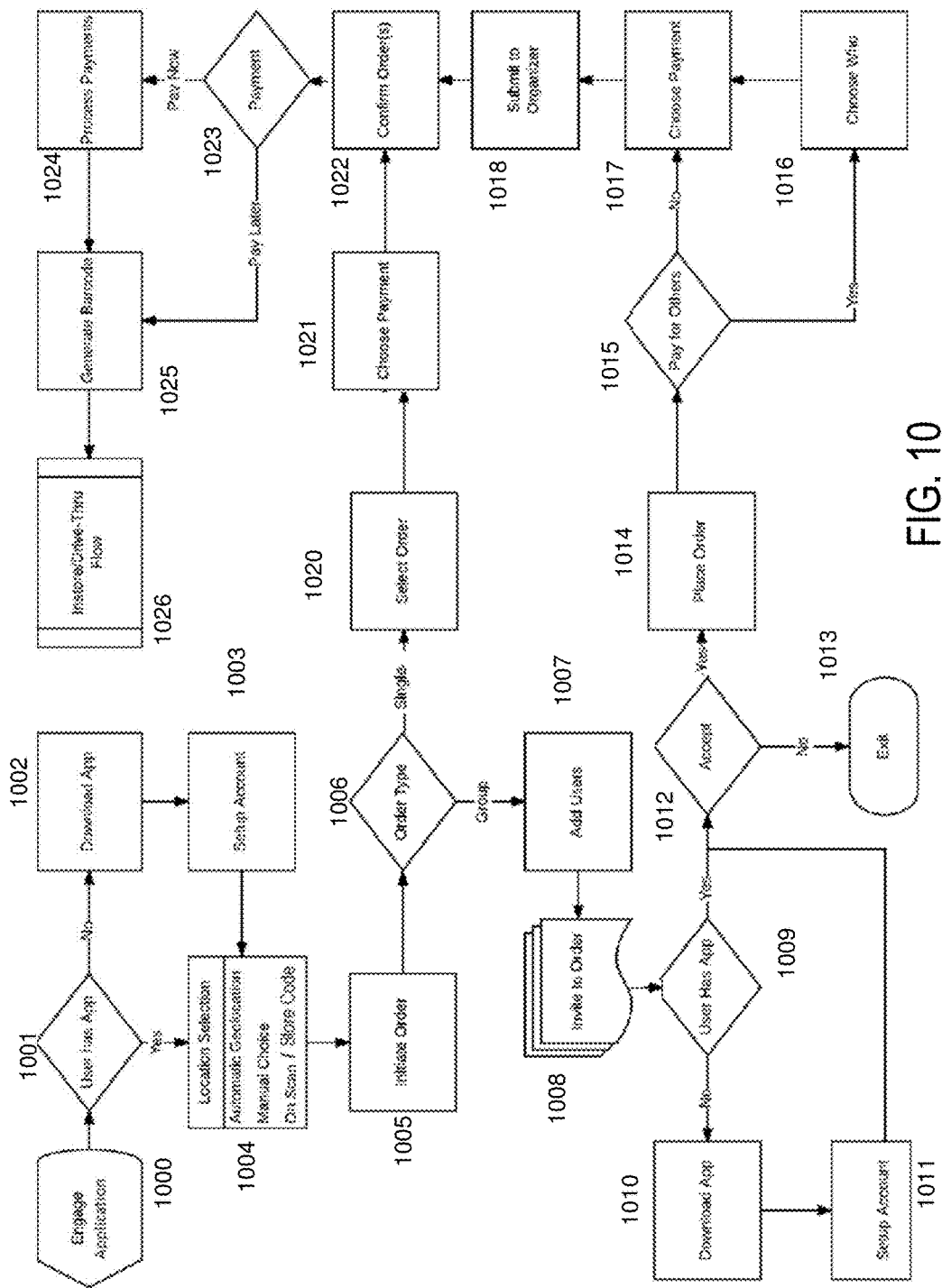
FIG. 10 illustrates an operational flow when an application is utilized.

Referring to FIG. 10, an example flow for the hardware and software elements of the present invention is presented.

The intent of the application may be to transform drive-thru ordering of products through a tool which may increase kitchen staff efficiency, reduce errors, and provide alternative ways for consumers to order and pre-order food at a fast food or a quick-service restaurant establishment. The combination of hardware and software may create novel operational flow, novel apparatus for the support of new types of flow and other such improvements.

In some examples, an application form of a software program may be installed on a mobile device. The fast food based application may be engaged by a user when preparing to order food. At step 1000 a user may attempt to utilize the application. A check may occur at step 1001 on a device that a user is utilizing. If the application is not present on the device, then the application may be downloaded 1002 and an account may be set up 1003. After account setup, the user may use the application at the same point on the flow when the earlier determination would have found that the application was present. The application may be used to select a location for the user to obtain a food product 1004.

In some examples, an automatic location selection process may be used. A gps or mobile unit based location may be determined by the application and that location may be compared to a location based database for food products in the proximity of the user, where such a list of proximate location may be presented to the user. In some examples, other information about the user may be accessible to the application, such as preferences about types of restaurants, specific brands of restaurants and the like which may be used to prioritize lists presented to the user. In other examples, the user may opt to enter a manual selection for a particular restaurant and/or location. The barcodes created by the system can be scanned at numerous restaurant types that support the application, regardless of location. One barcode may be scanned at any franchise location, thus identifying the user's arrival at a specific restaurant upon scan. In some examples, during the ordering process the application may determine the nearest or most appropriate, based on other metrics, restaurant for the user to go to, if the user is open to the system making such a recommendation. The system may interface with other applications to assist the user with directions to such chosen restaurants.

At step 1005, the user may initiate the order process. The applicant may query the user, at step 1006, whether the order processing is for the user alone or for the user and one or more acquaintances. If the order is an order for a group of people, a repetitive loop of steps may occur to determine the identity of the users in the group 1007. The initial user may identify or invite other users by various means including their mobile number, their email address, an identification from various social media applications or other such means. For each of the group of identified users, the application may reach out to them with an invitation 1008. Each of the users may be contacted on a device where the presence of the application may be assessed 1009. If the application is not present on the next user of the group's device, it may be downloaded 1010 and the user's information may be used to set up an account 1011.

The application may receive a response from the user as to whether he wants to participate in the group order 1012. If the user rejects the invitation, then that user is terminated from the group 1013. The process may occur for each of the users identified in the group or until a timing deadline is reached. In some examples, the originator of the group may be asked for a deadline for group members to add their orders. In other examples, the user may obtain a status of the group members in their ordering process and may elect to end a waiting period for any members who have not completed their ordering process.

For users who accept the invitation, the applicant may allow them to place an order 1014. The application may offer to the user the ability to pay for their own order as well as an option to pay for the order of others in the group 1015. In many cases, the first user of the group may opt to pay for the entire group of subsequent users. Nevertheless, flexibility for other payment options may exist where other members of the group may pay for themselves or others. If the user from the group indicates they would like to pay for others, they may be presented with a list of the users in the group that they may pay for. At step 1016, the user may choose which of the group to pay for. At step 1017, the user may choose a manner of payment. For users in the group whose orders have been selected to be paid by another, the user in question may opt whether to accept the payment of another and for other situations the user may choose a method of payment. In some examples, users may have standard forms of payment that they may store on a database that the application interacts with. At step 1018, the first person who initiated all the ordering, who may be considered an organizer, may receive a submission of the orders of the group, the payment status, and the like. The organizer may finalize the ordering preparation process and confirm the orders at step 1022.

If there is no group order, then the ordering process may step from the previous step 1006 to a step where the user can select an order for themselves 1020. At step 1021, the user may make a selection of the manner of payment for the order. The application may default to a user's favorite method of payment. As with the group process, there may be numerous forms of payments that may be stored about a user on a server system associated with the application. In other examples, the user may provide information about a new form of payment, gifting rewards points, sharing store promotions, or other payment methods.

The payment for the order may next be presented to the user at step 1023. In some examples, the user may be given a choice between paying for the order after authorizing the order at step 1024. In which case, the payment will be processed. Alternatively, the user may opt to complete the payment at a later time. Processing may proceed to next generating a code 1025 associated with the order such as a 2-dimensional barcode or other unique identifying code. After the generation of the code, the processing may continue to one or more different flows related to use of the code 1026 in store, at a remote dispenser, or through a drive-thru. The application can generate unique barcodes, for users to place "Quick Orders," making payment, validating orders in-store and drive-thru, and picking up food from dispenser apparatus. Users may choose to receive notifications when an order is placed, when payment is made, when their order is ready for pick-up and other key functions of the operational process.

In some examples, the application may include a feature to "send order by me" command. Capability to send quick order or automatic "go-to" order to a certain restaurant or dispenser. In using the feature, a user may preselect a store, pick store by distance, route, direction, proximity, by landmarks/locations, time, or other methods. In some examples, the user may use voice control in controlling features.

Throughout this description reference is made to the use of "barcodes". It is understood that the use of the word "barcode" can be interpreted as a cryptographic representation or variations of images, codes, or other representations, which can be used to, but not limited to, unlock, decode, translate, transmit, or process a plurality of user information, payment information, order information, or any other information that is pertinent to the operation or use of the systems discussed within.

In-Store Flow.

Figure 11:
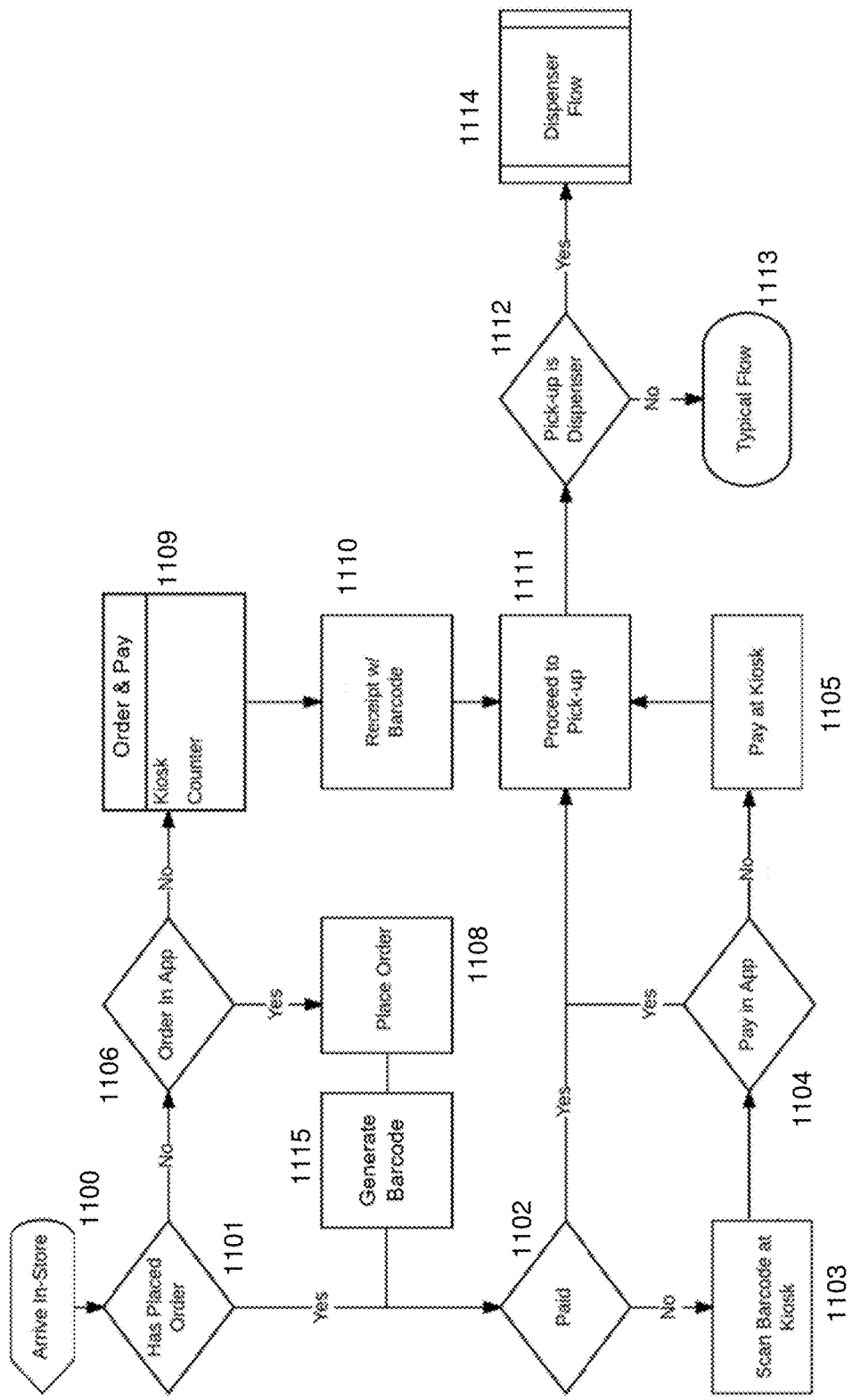
FIG. 11 illustrates an operational flow within a store.

In some examples, an order flow may be initiated with the application flow as described and then completed in the store. In some examples, the steps described with the application flow may occur in-store and then they may naturally be completed in-store. Referring to FIG. 11, the operational flow for in-store completion of an order flow is illustrated. At step 1100, the user may arrive within the confines of a restaurant ("Store"). In some examples, a WiFi system, a Bluetooth system, other NFC systems or other communication systems of mobile devices, may interact with the user's mobile apparatus if the appropriate permissions have been given by the user, and they may be greeted with a notification on their mobile apparatus which may include a status of any orders that may have been placed. The operational flow in FIG. 11 depends up the state of whether an order has been placed already in step 1101. If an order has been placed, the operational flow then depends upon the state of whether the order has already been paid at step 1102. If the order has not been paid, the user may either pay directly within their app within the store or the user may scan a user-specific, generated barcode or unique identifier that they have been provided with by the application related to their order and the other information of relevance to the user. The scanning of the barcode may occur at a kiosk within the store 1103. The kiosk may interact with the user and ask whether the user would like to complete payment within the application at step 1104. If they do, the kiosk may communicate with the application to provide communication of that desire. Alternatively, the user may elect to pay at the kiosk 1105. In some examples the user may provide a credit card, a debit card, cash, or other forms of payment such as bitcoin, rewards points, gift card balances, or other electronic currency. In some other examples, the kiosk may offer to process payment as may be processed within the mobile device app, where a stored form of payment may be accepted at the kiosk. The kiosk may have numerous forms of security to provide validation of such a transaction such as facial recognition, finger print scanning and the like. After payment has concluded the user may proceed to pick-up their order at step 1111.

Referring back to reference step 1101, in an alternative, the user may not have already placed an order and may prefer to use the application to process their order. As discussed previously, such an instore order process may also proceed with a group order processing scheme. At step 1106, the user may proceed to the application and at step 1108, the user may place an order through the application which may result in the generation of a unique barcode 1115. After proceeding through this operational step, the operational flow may proceed to the previously discussed step 1102 for further operation.

In the alternative, at step 1106, the user may opt not to place their order in the application device. Under such circumstances, the user may proceed to order and/or pay at either a kiosk or at a service counter within the restaurant 1109. In some examples, the ordering process may result in the printing of a receipt that includes a unique, barcode pattern 1110 consistent with the other operational aspects discussed herein. In some other examples, a barcode may be provided to the user on a label separate from any receipt that may be provided. In still further examples, the barcode may be electronically provided to a smart device of the user in addition to any receipt. In any of these cases the user may proceed in the operational flow to pick-up their order at step 1111.

During the completion of the ordering process, the pick-up location may be designated to be a dispenser as defined within the present specification. The designation may be made, in some examples at the choice of a user through operation of the mobile application, or through choices made at a kiosk, or with verbal communication with an employee at the counter. In other examples, the restaurant logistics systems may elect to provide the order at a kiosk and this may be communicated to the user. The operational flow depends upon the state of whether the pick-up location is at a dispenser at step 1112. If not, the user may receive their order via a typical flow at step 1113. If the pick-up location is a dispenser, then the operational flow will continue at step 1114 with the operational flow relating to dispenser operations in sections following.

Drive-Thru Flow.

The operational flow aspects of the present invention provide operational aspects for drive-thru operational flows which may expedite the delivery of a pre-order from the app. The operations may also streamline drive-thru operations for users who do not use the application software and hardware of the present invention.

Locations utilizing the present invention may have the option of implementing a license plate scanner within drive-thru lanes. The automobile license plate may be scanned and associated with a user, either through information provided by users in their application or through previously filled orders of a user with an automobile comprising the license plate. When there is a match to a user, and a match to an existing order, the application will determine the status of the order.

Figure 12:
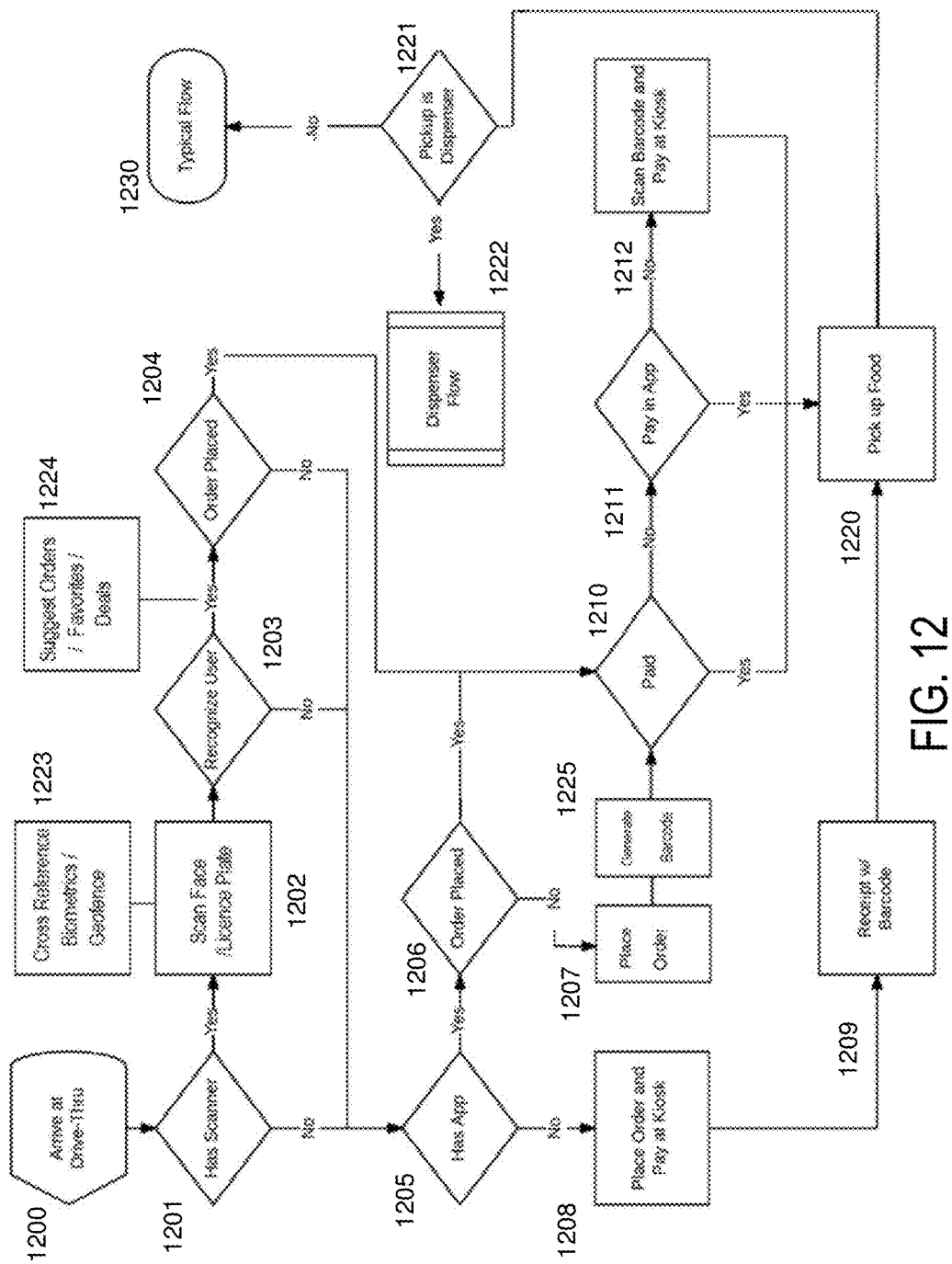
FIG. 12 illustrates an operational flow within a drive-thru.

Referring to FIG. 12, the operational flow aspects related to drive-thrus are illustrated. At step 1200, a user may arrive at a drive-thru. If the establishment has a license plate scanner the operational status at step 1201 may proceed through license plate scanning related operations. At step 1202, the license plate of the arriving vehicle may be scanned, or a user's face may be scanned, or a combination of both or several other identification methods. The system may include cross-reference related data including biometrics and coordination with geofence systems that can indicate the location of an identified user at step 1223. Analysis of data on the license plate may allow the controlling software of the system to determine whether the user is recognized at step 1203. The recognition of the user may allow the system to draw upon configuration aspects of the user 1224 which may include the ability to suggest orders based on previous orders, preferences, favorites, and the like.

There may be other means of identification of the user within a vehicle. In some examples, an automobile may communicate a unique identifier through its electrical systems through a WiFi, Bluetooth or other system broadcast. In some examples, the automobile may maintain a database and itself may be able to interact with communication systems of the restaurant at the drive-thru to understand the identity of the restaurant and communicate a specific identifying code associated with the car at the particular type of establishment. In other examples, the user's mobile device may communicate identifying information to the establishment at the drive-thru. Equivalently, if any of these methods are used, the resulting identification information may be used to determine whether the user is recognized at step 1203.

If the user is recognized, then the status of whether an order has been placed is queried at step 1204. If the order has been placed, then the operational flow proceeds to assessing whether the order has been paid for at step 1210. If any of the status queries, including whether there is a license plate scanner, whether there is a recognized user, or whether an order has been placed has a negative status, then the operational flow may proceed to whether the user at the drive-thru has the application on a mobile device at step 1205. If the user has the app, then the app is used to assess whether an order has been placed at step 1206. If an order has been placed, then the processing flow also proceeds to the step at 1210 of whether the order has been paid.

On the other hand, if the order has not been placed at step 1206, then the operational flow proceeds to step 1207 and the order is placed by the user on the app. The system may process the order and generate a barcode 1225 and processing also proceeds to the step at 1210 of whether the order has been paid for. If it has been paid, then the flow will proceed to allow the user to pick-up the food 1220. If the bill has not been paid, then the user may pay in an app 1211 after the user has scanned the unique barcode at the kiosk. If the user opts not to pay in the app, then the processing may proceed to the user proceeding to a kiosk, and then scan their barcode to order and pay 1212. The payment may proceed by a credit card charge, bill payment, or through using payment mechanisms set up in the account of the user on the application which may be accessible at the kiosk.

If at step 1205 the user is found not to have an application installed on a mobile device, the application flow may proceed to step 1208 where the driver may proceed to a kiosk where the user may place an order and pay for it. After the payment is completed, the user may receive a receipt with a unique barcode identifier thereupon 1209. The user may take the receipt to pick-up the food 1220.

When the processing proceeds to step, to pick-up the food 1220, a state may be resolved relating to whether the pick-up processing has been sent to a dispensing apparatus. 1221. If the processing has been sent to the dispensing apparatus, then processing proceeds to the operational flow for automatic dispensing, as mentioned in following sections 1222. If the dispensing is not sent to a dispensing apparatus, then processing proceeds to normal operations 1230 such as an employee dispensing a food order to the user.

Dispenser Flow.

The operational flow aspects of the present invention include steps related to the utilization of unique dispenser apparatuses. In some examples, a single type of dispenser is utilized in a number of locations of a store/restaurant. In others there may be tailored types of dispensers depending on the location of the apparatus within the store. A dispenser is a point-of-sale food pick-up device for orders placed using the application related flows as have been described. After marking the order with a unique barcode or identifier, kitchen staff can place the food order into the dispenser for easy retrieval by the user. The order can be scan, cataloged, and traced by matching the user-specific code with the said unique identifier from the kitchen.

In the various operational states as mentioned previously an order for food is placed with the restaurant. Upon receipt of the order, the store prepares and packages the food. Barcodes are used to identify the orders and placed on order containers. Barcodes are scanned prior to the order being placed in a dispenser bin to track the location of order and guide the customer to their order for automated pick-up. Upon scan, a dispenser pod is matched or paired to the item, which will then correspond with the customer's uniquely generated identifier scanned at pick-up.

Figure 13:
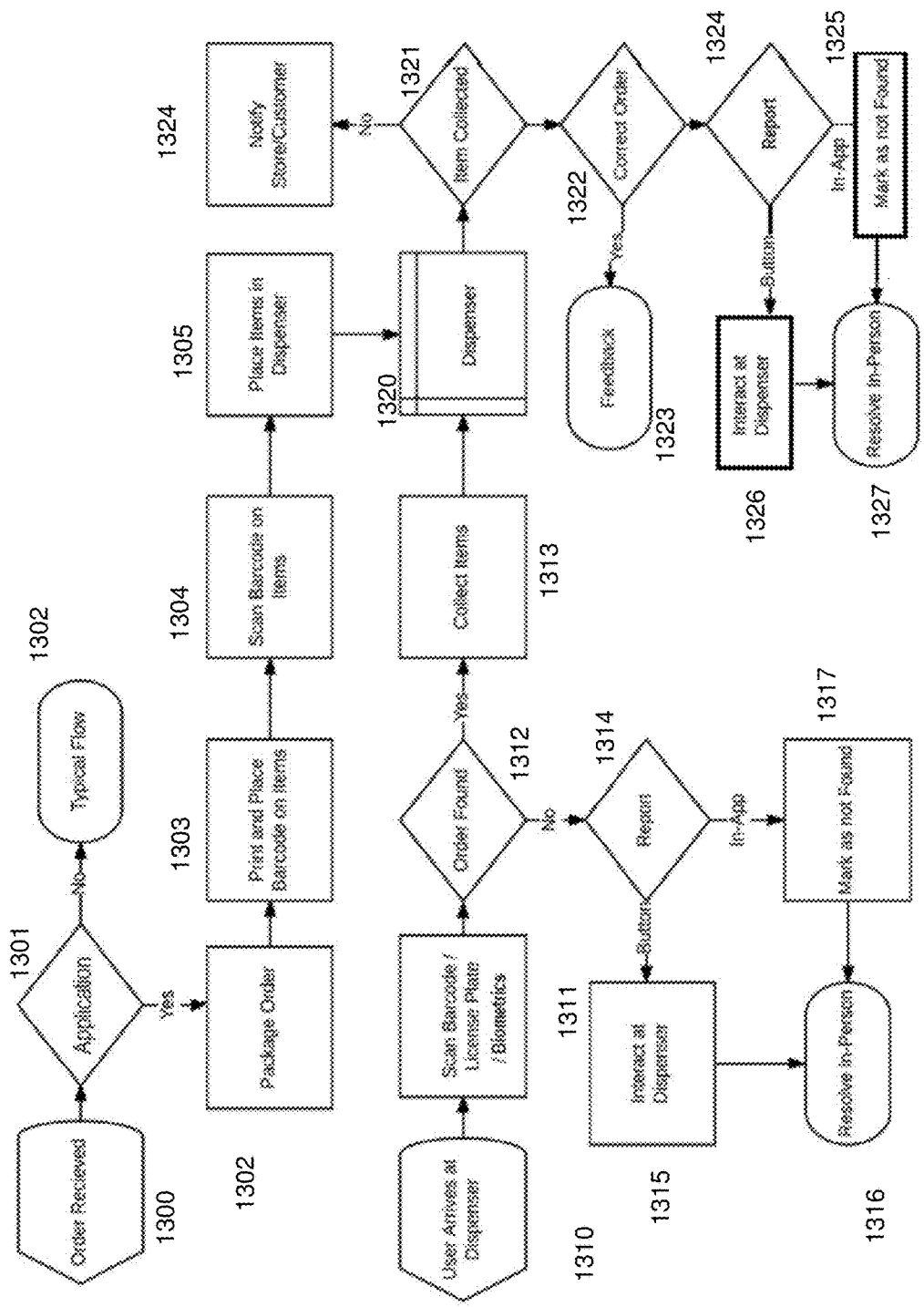
FIG. 13 illustrates operational flows relating to dispensing apparatus.

Proceeding to FIG. 13, exemplary operational flows related to the food dispenser are illustrated. At step 1300, a food order is received at the restaurant. At step 1301 a state variable is ascertained as to whether the food order has been placed through the application processes, which considers the use of printed receipts containing unique identifiers, as have been described. If the state is resolved that the order has not been placed through the application flows, then a typical form of dispensing at the restaurant is performed at step 1302. However, if the state is resolved that the order was placed through the application then a packaging flow step 1302 specific to the application is commenced. The food order will be labeled with a barcode that is printed for the order 1303. The processing may continue with a scan of the barcode immediately upon placing the label to ensure that the systems will be able to read the barcode properly 1304. Next, the food order may be placed within the automated dispenser 1305, which deploys an appropriate receptacle designated to the unique identifier upon scan. As mentioned previously in relationship to examples of the dispenser, the food order may be stored under conditions which may allow the warm items to be kept warm and the cool items to be kept cool at step 1320.

Continuing with FIG. 13, a user may arrive at a dispenser 1310. As mentioned, there may be numerous locations for a dispenser, however three standard locations may include a dispenser that is located within the order room of a restaurant such that the front of the dispenser faces the customers on one side of a wall and the rear faces the kitchen on the other side of the wall. In another example, the dispenser may also be located within a wall where one side faces a drive-thru lane and the other faces the kitchen of the restaurant. The third standard location may be remote from the restaurant in a standalone location. Restaurant staff may fill the dispenser from one side while customers access from the other in some examples.

As the user interacts with the dispenser they may provide information about themselves by scanning their barcode 1311 with a barcode scanner of the dispenser. In some other examples, the dispensing system may also be able to read a facial scan or license plate on a vehicle of the user for identification. Other biometrics may be obtained for identification purposes or cross-referenced with other identification methods. Methods as such may be paired with scanning systems at the time of order to assist in the identification of users who may or may not have used a mobile application or device. Next, the system may investigate whether the order related to the barcode/license plate is located in the dispenser at step 1312. If the order is not located in the dispenser, a report condition is flagged at step 1314. The report may be passed on to restaurant or other staff of the restaurant. The staff may interact with the customer 1315 at the dispenser. This may be through two-way communication devices at the dispenser, which may include an audio/video session through the kiosk of the dispenser. In other examples, a staff may resolve the discrepancy in person at step 1316. In other examples, the report of the missing order may be reported to the user through the application at step 1317. Hereto, staff of the restaurant may interact with the client in person to resolve the issue at step 1316.

When the order is found at step 1312, the processing will continue to support the collection of the items for the order 1313. In some examples, the processing at step 1320 may proceed to move a food conveyance and conditioning pod from a storage location to a location which may open up to the verified customer. Then the customer may collect their order at step 1321. In some examples sensors in the dispenser may sense whether the order has been fully collected and warn the user if not. If the item remains uncollected, communication to both the store and the customer may be made at step 1324 using the application and various communication means. If the item is collected, the system may query the user as to whether the order was the correct order at step 1322. In some examples, in addition to the answer of whether the order was correct, the customer may be given the chance to provide feedback 1323 about the order, quality and process to fulfill the order. If the order is incorrect, a report condition is flagged at step 1324. The report may be passed on to restaurant or other staff of the restaurant. The staff may interact with the customer 1326 at the dispenser. This may be through two-way communication devices at the dispenser, which may include an audio/video session through the kiosk of the dispenser. In other examples, a staff may resolve the discrepancy in person at step 1327. In other examples, the report of the missing order may be reported to the user through the application at step 1325. Hereto, staff of the restaurant may interact with the client in person to resolve the issue at step 1327.

Identification

There may be numerous types of codes that may be used to provide identification and operational information. In some examples herein, barcodes may be used including one dimensional barcodes, two dimensional barcodes and more sophisticated barcodes where color or holographically encoded information may be accessed. In some examples, 2D barcodes may be used in various steps throughout the ordering and pick-up process. Examples of the 2D barcodes may include those that use JSON Web Token (JWT) technology (such as may be found in reference to the web page https://jwt.io/) to encode data pertinent to a transaction.

Figure 14:
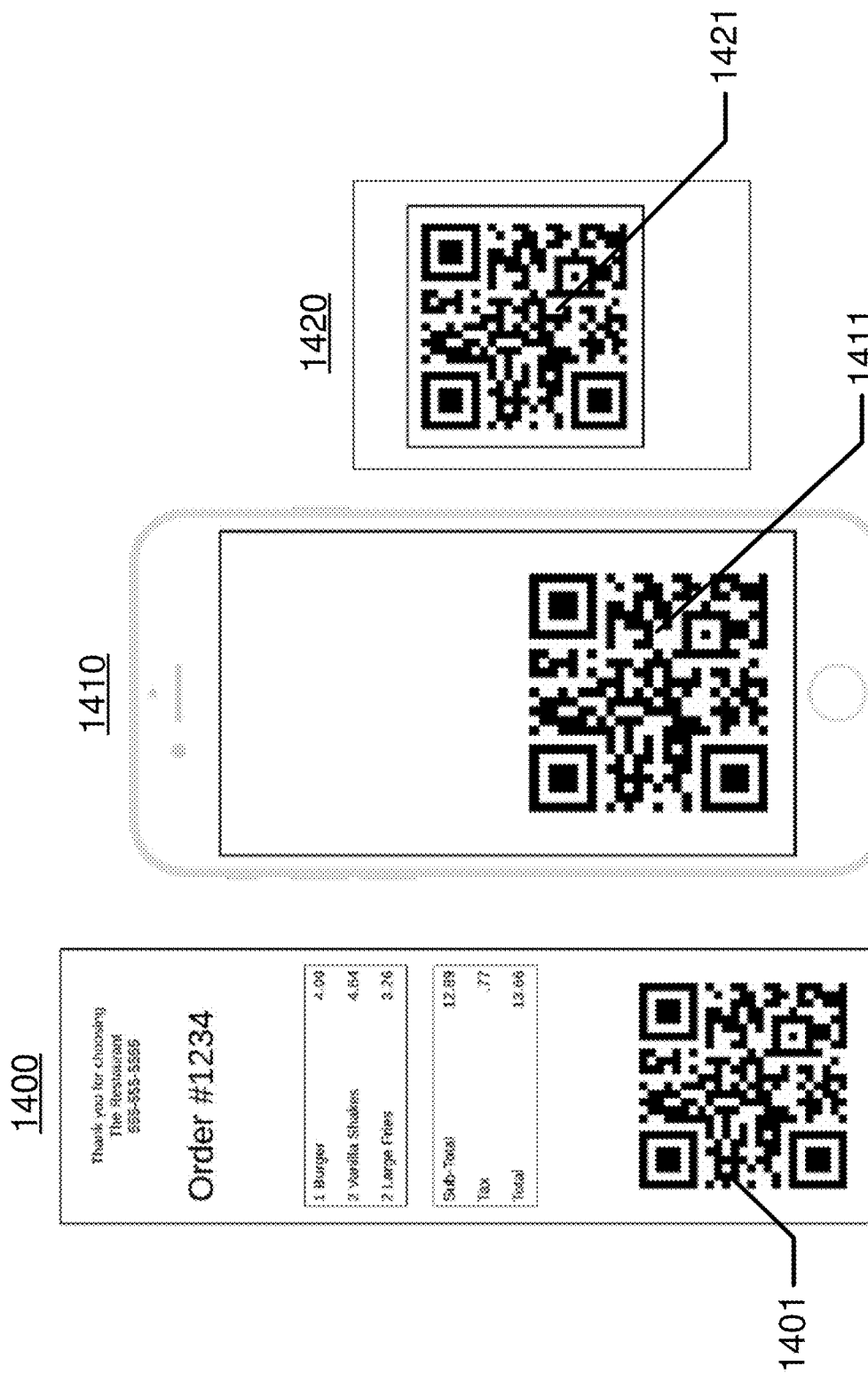
FIG. 14 illustrates exemplary forms of 2d barcodes.

The "Operating System" or application will decode and validate the tokens, and then process transactions. Referring to FIG. 14, the codes may be generated or read in various aspects of the operations discussed herein including on mobile devices with operating systems such as iOS and Android 1410 where the barcode may be a 2D code displayed on a screen 1411. In some other examples, the code may be generated on a receipt 1400 where the code is printed on the receipt 1401. In still further examples, the code may simply be printed upon a label at step 1420. In some examples, a label may be a tag which includes an embedded identification device 1421 such as an RFID, where an electronical representation of the barcode pattern may be stored and transmitted. The tag may also act as a proximity tool that pairs with a dispenser or dispenser bin, and may identify when an item is placed, present, or removed from said dispenser or dispenser bin. As shown a tag may have both a printed code 1420 and an embedded identification device 1421 or it may merely have the embedded identification device.

The barcode may contain numerous forms and values of information relating to the customer, the order, and other operational aspects. In an example, the information contained in the code may include the following data: data for transaction validation; a transaction type identifier; an order number; a location identifier; financial information such as the total cost of an order, and a signing key which may include the means to identify dispensing locations and storage bins and the information to unlock dispensing apparatus for an order with security. A signing key may be a unique identifier that is generated each time a barcode is requested and provides a secure manner to control the integrity of barcodes to users, orders and produced food products. This may ensure that a new, uniquely generated barcode may not be duplicated or copied, is user-specific, may only be used within the application, or is newly generated at the start of every order process, thus enhancing user security and order fidelity. Upon dispenser scan, the user-specific, uniquely generated barcode with signing key functionality may be encrypted, erased, locked, or any other method may be used in disabling the barcode and rendering it unusable or incompatible for future use.

"Quick Orders"

A user of the applicant may build an experience history as they utilize the application for purchasing orders. The overall operational flow may be controlled by software algorithms that operate on servers that may be located in a restaurant or remote from a restaurant. The user's identity may cause algorithms to pull up the order history of a user and display a set of "Quick Orders" which the user may select in as little as a single finger stroke. There may be numerous ways that the system choses and provides choices for the quick order scheme. In a first example, the system may look at order history and choose from the highest frequency orders that a user has made and provide the top ones as quick order options. In some examples, the frequency of orders may be time weighted so that the most frequently order most recent orders are dominant as choices for quick orders. In a different vein, in some examples the system may have access to other information related to the user and his environment where factors such as the temperature of the environment that the user is located in may influence the types of orders that are provided as quick orders. In some other examples, the recent history of orders of all users not just the user himself may provide a "socially" influenced list of quick orders. If the user has linked the application with social media systems, choices across "friends" of the user may be provided as a quick order for the user. In other examples, the system may have access to marketing promotions of a particular restaurant that a user is in proximity to and some of these may be provided to the user as a quick order. Saved favorites may also be categorized and stored for later use so the user only has a single button request to generate a favorite order to be scanned and paid for at kiosk arrival.

A quick order may function as a list of graphical options that is displayed to the user through a mobile device using the application or through a kiosk where the kiosk has been initialized to the user's identity for an interaction session. The user may touch one or more of the quick order options to get more information about the option, and ultimately as the user drills down to the information about the option, they may be able to touch a button to activate an order process of the button. The quick order process may create a barcode in much the same manner as has been described with information contained in the code such as a transaction type identifier, a particular quick order identifier, a user identifier, payment identifiers and the like.

Order/Package Label Logistics

When a kitchen utilizing the applications as discussed herein receives an order, the system may communicate a unique order label to apparatus in the kitchen which may be used to identify and track an order process. Said label may match or correspond to the user's unique identifier. At each step in the process of preparing the food order, assembling the food order, and placing the food order into dispensers a unique order label(s) will be scanned to allow the order and its associated status to be tracked, logged, and matched to a dispenser and corresponding user-specific, unique identifier. The printed label may include transaction type identifier, order numbers, location identifiers, financial information including total cost, a signing key, and the like.

Infrastructure Architecture

Figure 15:
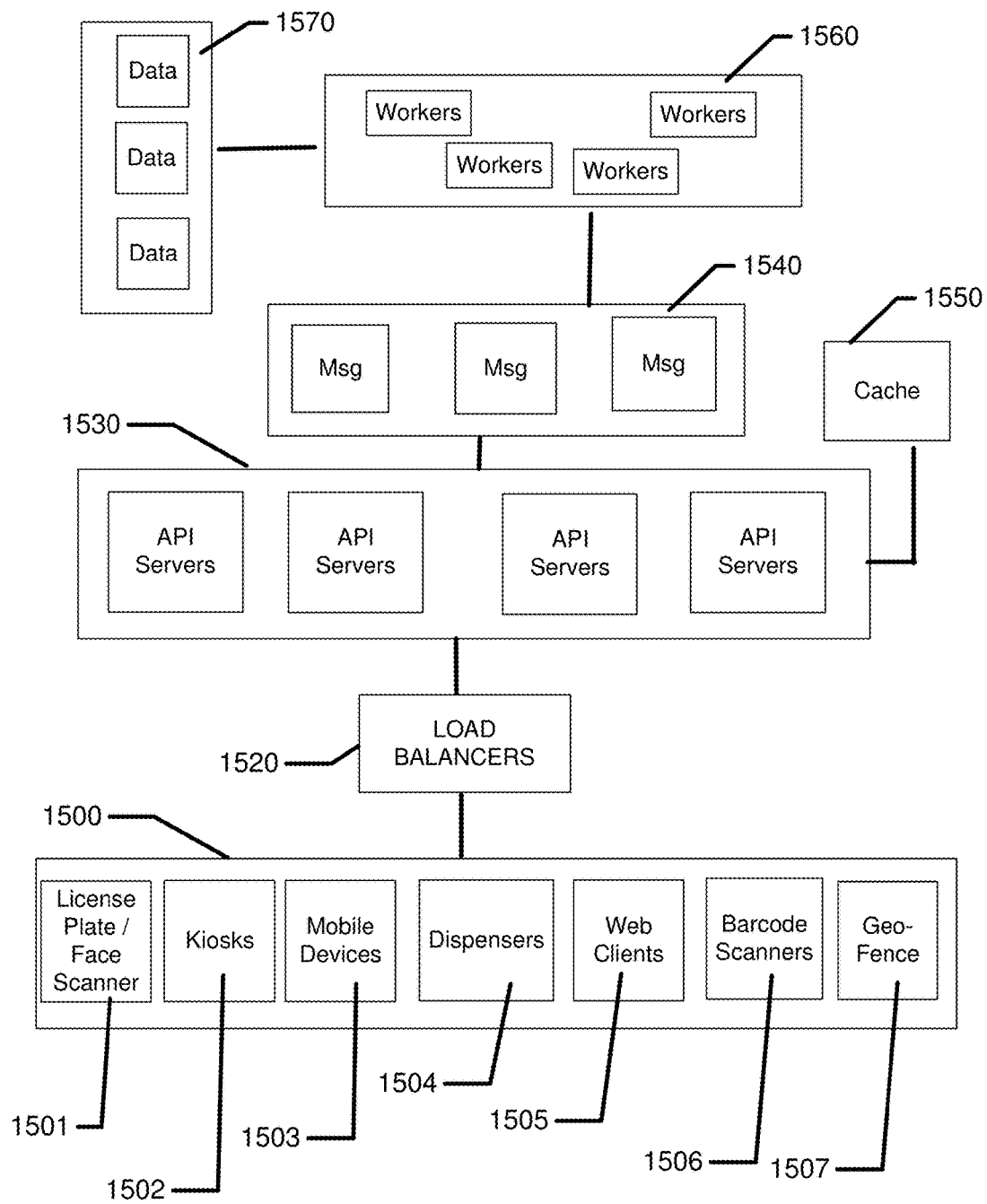
FIG. 15 illustrates an exemplary infrastructure architecture for operations.

A core aspect of the various operational improvements disclosed herein is the supporting information technology architecture and its associated software. In some examples, the infrastructure architecture platform makes use of a Service Oriented Architecture pattern. Referring to FIG. 15, an illustration of an exemplary platform shows the interconnection of various components. A collection of interfaces 1500 includes the devices that users will interact with across the platform. The collection of interfaces 1500 includes applications which drive various devices such as license plate scanners or facial scanners 1501, kiosks 1502, mobile devices 1503, dispensers 1504, web clients 1505, barcode/unique identifier scanners 1506, and geofencing infrastructure as non-limiting examples. The architecture may also include a load balancer 1520 which routes traffic to the "workers" 1560 based on the traffic load experienced by the servers 1530. The "workers" 1560 may include each service that may be managed by independent applications. Some examples of services which may be managed by a work include payment, ordering, unique code generation, receipt generation and the like.

Given the distributed nature of the service, as well as the possible scale of use, this exemplary architecture may be built to scale horizontally. As services receive higher amounts of usage, more servers may be added to a "pool" to handle the increased load. The API Servers 1530 provide the resource for processing transactions in the system. Requests will be routed to a Message Queue and distributed to other workers within the system. To make the system fault-tolerant, the architecture may use message queues 1540 to communicate between services and ensure that transactions are resent and processed in case of failure. Continuing with the architecture, various caching mechanisms 1550 may be used to ensure application speed is maintained at a high level. As well, various data stores 1570 may be implemented to hold application data.

Physical Architecture.

Various physical devices support the operational flows as have been defined. The physical architecture may include various hardware devices and software applications throughout the ordering and pickup process. Some of the physical devices may include barcode scanners, browser based applications, dispensers, food preparation and packaging devices, kiosks, facial scanners, license plate scanners, communication devices such as routers, WiFi nodes, near field communication hubs, mobile applicant platforms, receipt and label printers as non-limiting examples. Each of these elements may work with one another in various ways throughout the process.

Different combinations of these different device types may be used in the store versus at the drive-thru and in other external locations. A user who engages with the system in-store may interact with the system with numerous exemplary devices. For example, a mobile device may be used in-store to place an order, invite users for group orders, and generate barcodes for various activities with the application on their mobile device. Another example may include a kiosk with barcode scanners which may enable a user to place an order in various manners. The kiosk with barcode scanner may interface with a user's mobile device, or it may be used to manually place an order. The kiosk with barcode scanner may enable the user to pay with their mobile device, or pay directly through the kiosk. A barcode printer made be used in cases that the user does not use the other aspects of the application; in which case they will receive a receipt with printed, use-specific barcode to interact with the rest of the operational flow. Dispensers may be located in store to dispense from the kitchen to the customers in the restaurant hall.

The drive-thru operations of the system may use some of the same physical architecture as is used in store but in different ways, and it may have additional devices. For example, the external drive-thru may have a combination of license plate scanners that may identify a customer as they approach the restaurant and drive-thru and another set of scanners when they pick-up their food at a dispenser. There may be two types of dispenser related to drive-thru operations. In a first example, a dispenser may be located at a wall of the restaurant, so the restaurant staff may load from the kitchen and the user may pick-up thru the drive-thru lane. In another type of external operation, a standalone dispense may be used where the dispenser does not pass thru a wall and a car may pull up to an isolated dispenser device. Remote orders placed ahead of time may come to a designated dispenser as well. The user may engage the system through use of their mobile device. The use may employ the mobile device to place an order, invite users for group orders, and generate barcodes for various activities with the application on their mobile device. The external physical architecture may include a kiosk with a barcode scanner which may allow a user to place an order with their mobile device, manually place an order at the kiosk, pay with their mobile device, and pay through the kiosk. The kiosk may also include a barcode printer for users to print a barcode receipt if they are interacting with the system without a mobile device application. The dispenser itself may include a hardware component with functionality similar to a kiosk.

Another set of operations which include a physical architecture may be within the kitchen. Employees who are preparing the food and performing operations may receive information and directions from browser based applications displaying information on terminals to process orders, print labels for food items or containers, and track orders. Barcode and label printers may be used to create the user-specific, barcode labels to organize logistics and ensure food location and correct order placement into dispensers. A number of types of dispensers will physically interact with the kitchen where employees may load food packages with barcodes thereupon. A track system, belt, mechanized item container, or other means of transporting, automatically labeling, scanning, pairing with a dispenser bin, or loading items into a dispenser or dispenser bin may be used. This may aid kitchen staff in item queue management, tracking, scanning, or delivery into the dispenser. Scanners in the kitchen and at the dispenser may be used to track food products as they are processed and in their storage locations within dispensers. Said user-specific barcodes, may match the same one-time, user-specific generated barcode given to a customer.

SPECIFIC EXAMPLES

Ordering Process at a Kiosk

The methods, apparatus, and application software as have been described may be used in some examples to enable use of kiosks in the ordering process. Referring to FIG. 16, at step 1600 the ordering process may optionally commence with a facial scan. At Step 1601, a user may be allowed to place an order at a kiosk, or on a mobile device first and then scan a resulting order barcode at the kiosk. At step 1602, the system devices may communicate the order, identification and other data to servers/cloud and receive information back to a mobile device to constitute a barcode. At step 1603, the process may continue with the issuing of an order to a restaurant to create a logistics order in kitchen and signals to a label printer to print a barcode. At step 1604, the kitchen of the restaurant may prepare the order and affix the label to a tray, cup, or other packaging. At step 1605, a member of the restaurant staff may place the prepared food order into a dispenser and optionally scan barcode with a barcode scanner to ensure that the system has recorded the correct location of a specific order. At step 1606, communicate progress of order to customer. At step 1607, initiate a communication process at the dispenser where the customer presents their mobile device with barcode to scanner at the dispenser. At step 1608, the system may issue commands to move the dispenser positions to open the pod with the order to the customer where they pick out the order. Variations of this specific example are well within the intent of the present disclosure.

License Plate Scanning and Ordering

The methods, apparatus, and application software as have been described may be used in some examples to enable license plate scanning techniques in the ordering process. Referring to FIG. 17, at step 1700, allow a user to drive a car through a drive-thru lane of a restaurant. At step 1701, a license plate scanner may be used to scan a license plate of the car as it enters the drive-thru lane. At step 1702, the system may communicate license plate image data to servers/cloud processing of the system. At step 1703, servers or cloud based processing devices may be used to process the image data of the license plate to determine if the license plate data is associated with a user in the system. This may be cross-referenced with facial scanning, biometrics, geo-positioning, geofencing, and the like to improve user identification effectiveness. At step 1704, the system may allow the user to place an order with a mobile device within the car at an outdoor kiosk. In some cases, the user may have already placed an order or have an automatic "go-to" order placed and charged upon scan. The user may confirm or edit the order upon identification at the kiosk, as well as have order suggestions presented. In some cases, if the user elects to edit the order, the user may be charged or credited with a change in price, either through the application or through the kiosk's pay functionality. At step 1705, the system may communicate order data from the kiosk to servers/cloud processing of the system. At Step 1706 a system order may be created and communicated. As well, the system may communicate a barcode to the mobile device of the user. Variations of this specific example are well within the intent of the present disclosure.

License Plate Scanning and Dispensing Apparatus

The methods, apparatus, and application software as have been described may be used in some examples to enable license plate scanning techniques in the order dispensing process. Referring to FIG. 18, at step 1800, the system may allow a user to place an order via any accepted process to a restaurant that associates the order with the user of the system application. At step 1801, the system may allow a user to drive a vehicle through a drive-thru lane to a dispenser. At step 1802, the system may use a license plate scanner at the dispenser location to scan the license plate of the car. At step 1803, the system may send image data related to the license plate scan to servers/cloud and determine if the user is in the system. This may be cross-referenced with facial scanning, biometrics, geo-positioning, geofencing, and the like to improve user identification effectiveness. At step 1804, if the user is in the system and an order is ready for pick-up at the dispenser move a related food product to a pick-up location of the dispenser. At step 1805, the system may optionally send a barcode or code to a mobile device of the user and request the user enter the code or scan the barcode to a barcode scanning device associated with the dispenser to authorize dispensing. In the alternative, the system may authorize the dispensing based solely on recognizing they user based on the license plate scan and recognizing an order associated with the user at the location of the dispenser. At step 1806, the system may dispense the product to the customer of the vehicle at a dispenser. Variations of this specific example are well within the intent of the present disclosure.

Operational Flows not Involving Mobile Application Processing

The methods, apparatus, and application software as have been described may be used in some examples to enable ordering and dispensing flows that do not involve mobile application processing. Referring to FIG. 19, at step 1900, the system may allow a user to approach a kiosk within a restaurant without a mobile device. At step 1901, the system allows a user to place an order at a kiosk without a mobile device. The user may log onto the system with a password to provide identification aspects. And, in some examples, the kiosk may use facial or other biometric means, which may be supplemented by geofencing and the like, to identify the user. In some other examples, a user may log on as a guest user without identification to the server, so long as a local means of payment are enabled. At step 1902, the system may communicate the order, identification and other data to servers/cloud and receive information back from the system to the kiosk. A receipt may be printed with a unique barcode at the kiosk and distributed to the user. At step 1903, the system may issue an order to the restaurant to create a logistics order in kitchen. The communication may include signals to a label printer to print a barcode in the kitchen. At step 1904, employees of the restaurant may prepare the order and affix the label to a tray, cup, or other packaging. At step 1905, staff of the restaurant may place the order into a dispenser and optionally scan barcode with a barcode scanner to ensure the integrity of the identification and location of the food product. At step 1906, the system may communicate progress of the order to the user. At step 1907, the system may initiate a communication process at the dispenser where the customer may present their receipt with the barcode to a scanner at the dispenser. At step 1908, the dispenser may verify the barcode presented to it and find the appropriate bin location of the order. The bin may be moved to a position where it can be opened to a user, so they may receive their order. Sensors within the bin may verify that the bin is empty after the user receives their order and may automatically close the bin. Variations of this specific example are well within the intent of the present disclosure.

Operational Flows with Drive-Thru Point of Sale Kiosk Scan

The methods, apparatus, and application software as have been described may be used in some examples to enable ordering and dispensing flows that do not involve mobile application processing. Referring to FIG. 20, at step 2000 the system may allow a user to drive a vehicle to a restaurant and engage the system even if they do not have a mobile device. At step 2001, the system may allow the user to drive the vehicle through a drive-thru lane at the restaurant. At step 2002, the system may utilize a license plate scanner to scan an image of the license plate. In some examples, the license plate scanner may include system aspect that convert the image it collects to a textual value for the identity on the license plate. Either the image or such textual identity may be passed to the system at step 2003. At step 2004, if the license plate scanner does not process the image itself, the system may process the image data to determine if the license plate data is associated with a user in the system. Additional identification methods, such as geofencing and the like, may be used to supplement license plate scanning. Such a determination may also occur with textual data passed from the license plate scanner. At step 2005, the system may allow the user to place an order without a mobile device at an outdoor kiosk. In some examples, the user may engage the kiosk with verbal communication. In some other examples, the system may allow the user to engage the kiosk with touch screen interface. At step 2006, the system may print a receipt for the order with a unique barcode and distribute it to the user. Variations of this specific example are well within the intent of the present disclosure.

License Plate Scan for Dispensing without Mobile Application Processing

The methods, apparatus, and application software as have been described may be used in some examples to enable ordering and dispensing flows that do not involve mobile application processing. Referring to FIG. 21, the system may allow the user to drive a vehicle to a restaurant after placing an order 2100 by one of the means identified in various sections of this specification. At step 2101, the system may allow the user to drive the vehicle to a location that is close to a food dispensing device. At step 2102, the system may use a license plate scanner to scan the license plate of the user at the dispenser location. At step 2103, the system may communicate the license plate image data to servers or cloud processing devices of the system. Alternatively, the license plate scanner may interpret the image and provide a textual license plate indicator. At step 2104, if the scanner has not provided the textual license plate information, data processing systems may process the image data to determine if the license plate data is associated with a user in the system. Additional identification methods, such as geofencing and the like, may be used to supplement license plate scanning. At step 2105, the system may allow the user to present a receipt with a barcode to a scanner at the dispenser. At step 2106, the system may provide the food product to the user with the dispenser after validating the barcode pattern or user upon license plate scan. Variations of this specific example are well within the intent of the present disclosure.

Generation of One Time Identifiers for Shared Orders

The methods, apparatus, and application software as have been described may be used in some examples to enable ordering and dispensing flows for groups of users. Referring to FIG. 21A, at step 2110 the system may display menu options for a restaurant with an application on a mobile device to a user on the mobile application. At step 2111, the system may allow a first user to initiate a group ordering process on a mobile device. The group ordering process may be found as a touch screen accessible function on the application or may be invoked in other manners from the application. Continuing at step 2112, the system may collect a number of group users and identification of users from the first user. The first user may invite members of the group by sending an invitation from within the application to contact information from the mobile application device. In other examples, the first user may search for members of the system application and choose these individuals for communication by the system to invite them to join a group order. In some examples, the first user may communicate a group order session identification that interested user may enter into versions of their mobile application of the system to elect to join a group ordering session. At step 2113 the system may repeat an ordering process with each group user that has been joined to the group ordering. The repeated process may comprise the steps of inviting the user to present an order. The system may present menu options, may collect user selections if made, and may confirm selections with each user. As the process continues, some users may elect to offer to pay for themselves and one or more other users and for the other users, the system may inform other users if others have offered to pay. During the course of the group ordering process, at step 2114 the system may communicate the status of each group user's order to the first user. In some examples a screen may include a list of the user names along with a status as a non-limiting example. Depending on the amount of time the first user may wish the group ordering process to complete in, the first user may allow the group order process to complete regardless of the amount of time that it takes, or the first user may elect to impose a completion status on the order regardless of whether each user has completed an order in the group process at step 2115. Continuing at step 2116, the system may process the group order details, the payment information of each of the group users, the customer information for each user including whether they are a registered user of the system, merchant information related to the restaurant where the purchase will occur, and menu identification information for what has been ordered. The result of the system processing the information may be the generation of an order and a unique barcode identifier for the first user to use for operation purposes of the system. At step 2117, the system may communicate the unique barcode information to a mobile device of the first user. The user may elect to send the group order to a designated pick-up location, which may be selected before the user sends an order invite, or may elect to arrive at any location to scan the unique barcode, which will process the order onsite. Variations of this specific example are well within the intent of the present disclosure.

Example of Layout of Physical Elements

Figure 22:
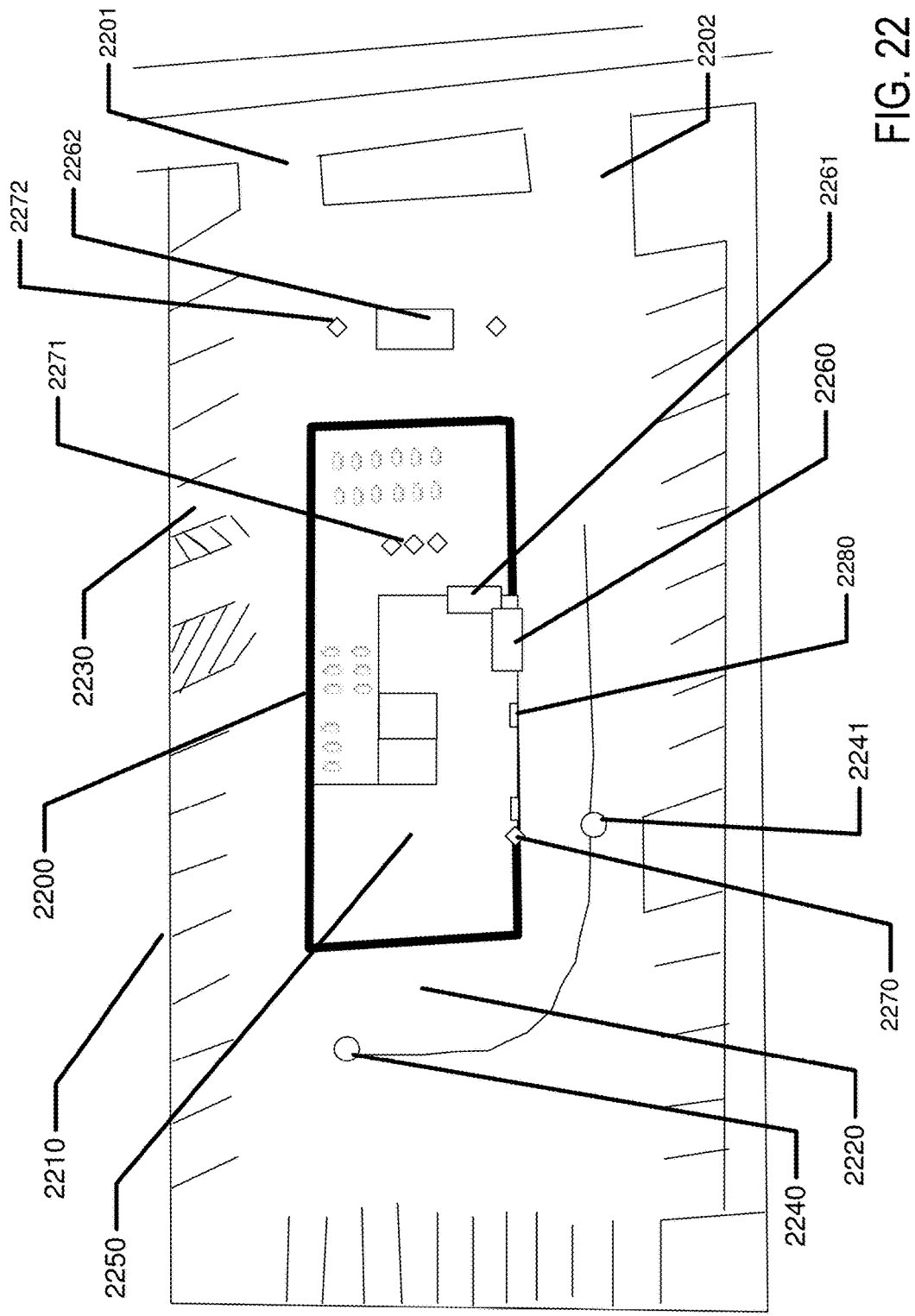
FIG. 22 illustrates a schematic map view of a fast food restaurant with elements of the present invention incorporated.

Referring to FIG. 22, an example map-view illustration of the order may be found. A fast food restaurant 2200 may be located on a drive in facilitated lot 2210. The lot may have an entrance for cars 2201 and an exit 2202. Therefore, flow of the cars may generally be from right to left on the top and from left to right on the bottom of the illustration. There may be numerous parking spots along the perimeter of the lot including handicap parking 2230. The lot may have a drive-thru lane 2220. In some examples, the drive-thru lane may have a license plate scanner 2240 at the entrance of the drive-thru lane and another license plate scanner 2241 proximate to the end of the drive-thru and where food may be picked up. The restaurant may have various kiosks including some kiosks 2270 along the drive-thru lane, some within the lobby of the restaurant such as kiosks 2271 and others at external remote locations 2272. Delivery window 2280 may deliver food or help users in typical fashion, outside of dispenser flow. There may be food dispensing apparatus including a food dispenser within the restaurant 2261 which abuts the lobby and the kitchen area 2250. Another food dispenser 2260 may provide access to cars in the drive-thru lane and abut the kitchen area 2250. An external dispenser 2262 may provide access remote from the restaurant and be filled by staff walking from the kitchen, or other delivery methods. There may be numerous layouts that are possible with some or all of the physical elements as have been shown in FIG. 22 and/or describe in this specification. Other technology not mentioned may be incorporated to fulfill some of the functions as described or additional function. The illustration in FIG. 22 may illustrate how various elements may be spatially related.

Remote Location Dispensing.

The methods, apparatus, and application software as have been described may be used in some examples to enable ordering and dispensing flows for groups of users. Referring to FIG. 23, at step 2300 the system may optionally commence an ordering process with a facial or license plate scan to determine the identity of a user. Combinations of scanning methods, or the use of geofencing and the like, may supplement identification from scan. Such a scan may occur at a kiosk, or at a computer or mobile device comprising a camera. At step 2301, the system may allow a user to place an order on a mobile device or other device capable of running the operation. The system may also allow the user to request the order to be delivered to a remote location dispenser. Alternatively, the user may place an order at a kiosk, with barcode receipt printing capability, adjacent to the dispenser. At step 2302, the system may communicate the order, identification and other data to servers and/or cloud processing. The system may use the information to determine an appropriate restaurant to notify about the order as well as the nature of the request for the restaurant to deliver the order to a remote dispenser. Continuing at step 2303, the system may receive an approval by the restaurant to accept the order and to accept the delivery to a remote dispensing device. The system may then operate with the kitchen of the restaurant to initiate processing of the order and to create the control signals to create a label with a printer in the kitchen operation. At step 2304, staff of the restaurant may prepare the order and affix the label to a tray, cup, or other packaging related to the order. At step 2305, the operations of the system may deliver the order into the remote dispenser along with an optional scan of the identification barcode on the food product. At step 2306, the system may communicate process status of the order to the customer along with a unique barcode for the user to use for order pick-up. At step 2307, the system may initiate a communication process at the remote dispenser where the customer presents their receipt or mobile device which is displaying the barcode to a scanner at the dispenser. At step 2308, the system may validate a presented barcode and move the dispenser position to open the pod containing the order to the customer for them to pick it up. Variations of this specific example are well within the intent of the present disclosure.

Remote Location Dispensing and Drone Replenishment.

The methods, apparatus, and application software as have been described may be used in some examples to enable ordering and dispensing flows for groups of users. Referring to FIG. 24, at step 2400, the system may allow a user to place an order on a mobile device or other device capable of running the operation. The system may also allow the user to request the order to be delivered to a remote location dispenser. Alternatively, the user may place an order at a kiosk, with barcode receipt printing capability, adjacent to the dispenser. At step 2401, the system may communicate the order, identification and other data to servers and/or cloud processing. The system may use the information to determine an appropriate restaurant to notify about the order as well as the nature of the request for the restaurant to deliver the order to a remote dispenser. Continuing at step 2402, the system may receive an approval by the restaurant to accept the order and to accept the delivery to a remote dispensing device. The system may then operate with the kitchen of the restaurant to initiate processing of the order and to create the control signals to create a label with a printer in the kitchen operation. At step 2403, staff of the restaurant may prepare the order and affix the label to a tray, cup, or other packaging related to the order. At step 2404, the system may dispatch a drone to the restaurant. In some example, the dispatch may occur well before the preparation of the food is completed. The drone may carry a transportable pod that may contain the order and keep it at a regulated temperature or temperatures. The restaurant staff may affix a portable pod containing the order to the drone. At step 2405, restaurant staff may dispatch the drone from the restaurant. The system may coordinate the flight of the drone to go to the remote dispenser. At step 2406, the system may engage a transfer process to load the transportable pod into the remote dispenser. In some examples, the drone will pick-up an empty transportable pod from the dispenser and travel back to a base location with it. At step 2407, the system may communicate process status of the order to the customer along with a unique barcode for the user to use for order pick-up. At step 2408, the system may initiate a communication process at the remote dispenser where the customer presents their receipt or mobile device which is displaying the barcode to a scanner at the dispenser. At step 2409, the system may validate a presented barcode and move the dispenser position to open the pod containing the order to the customer for them to pick it up. Variations of this specific example are well within the intent of the present disclosure.

Ordering with the Application

Figure 25B:
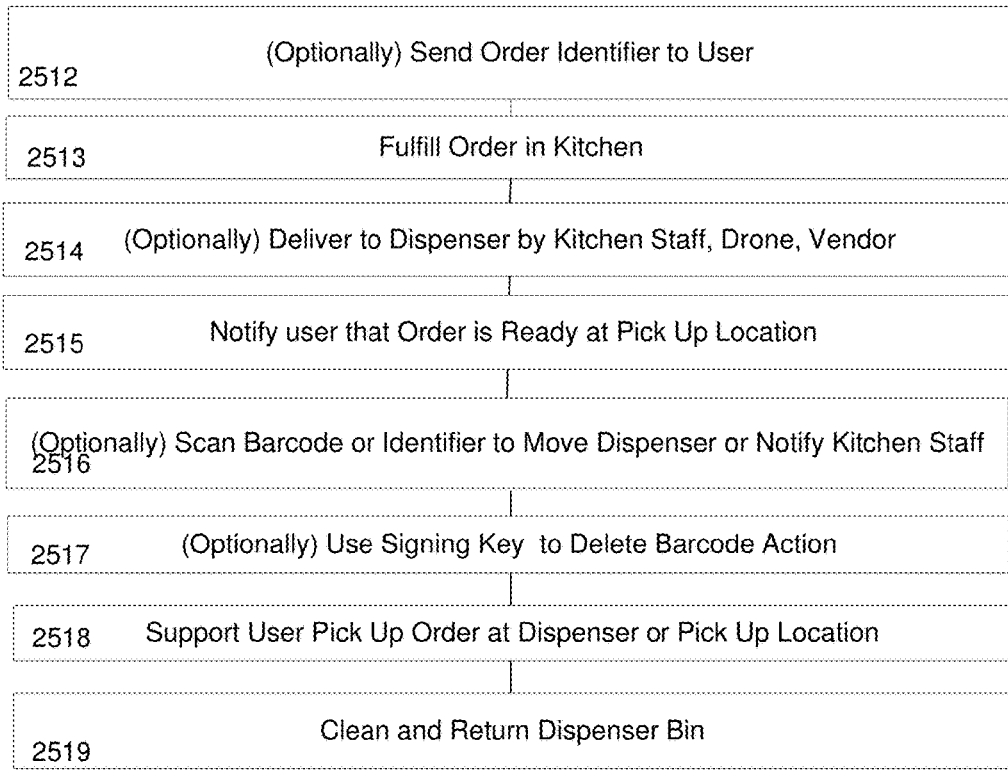

The methods, apparatus, and application software as have been described may be used in some examples to enable ordering and dispensing flows for groups of users. Referring to FIG. 25A, at step 2500, the system may facilitate user selection of a store or a dispenser to receive an order in the application. There may be various methods to communication such as through scans, on voice command, through app, and the like. At step 2501, the system may optionally facilitate the user to send an order request to other users and combine request. At step 2502, the system may facilitate the user to select their order and to configure or confirm payment options. At step 2503, the system may ready a queue for the order. At step 2504, the various processes may be coordinated by the system. At step 2505, the system may generate a unique barcode. At 2506, the system may await the arrival of the user to the store or to the dispenser. At step 2507, the system may utilize a license plate scanner or a facial scanner to recognize the user. In some examples, at step 2508 the user may be facilitated to place an order through a scan at a kiosk. In some examples, at step 2509 a process such as a signing key process may be used to delete the barcode or render the barcode useless. At step 2510, the system may offer means to pay contingent on whether payment has already been made with the application. At step 2511, the system may coordinate processes of the kitchen to realize the order. Referring now to FIG. 25B, at step 2512, the system may optionally send an order identifier to the user which may in some examples, involve a unique barcode. At step 2513, the order may be processed in the kitchen. At step 2514, the system may optionally coordinate deliver of the order to a dispenser by kitchen staff. At step 2515, the system may notify the user that their order is ready for pick-up. At step 2516, the system may optionally scan a barcode or other identifier to move a dispenser location for pick-up. At step 2517, the system may optionally delete the activity of the barcode or render it useless. At step 2518, the system may support the user to pick-up their order either at a dispenser or a pick-up location. At step 2519, in examples where a dispenser has been used the system may clean a used dispenser and return it into operation. Variations of this specific example are well within the intent of the present disclosure.

Ordering without the Application

Figure 26A:
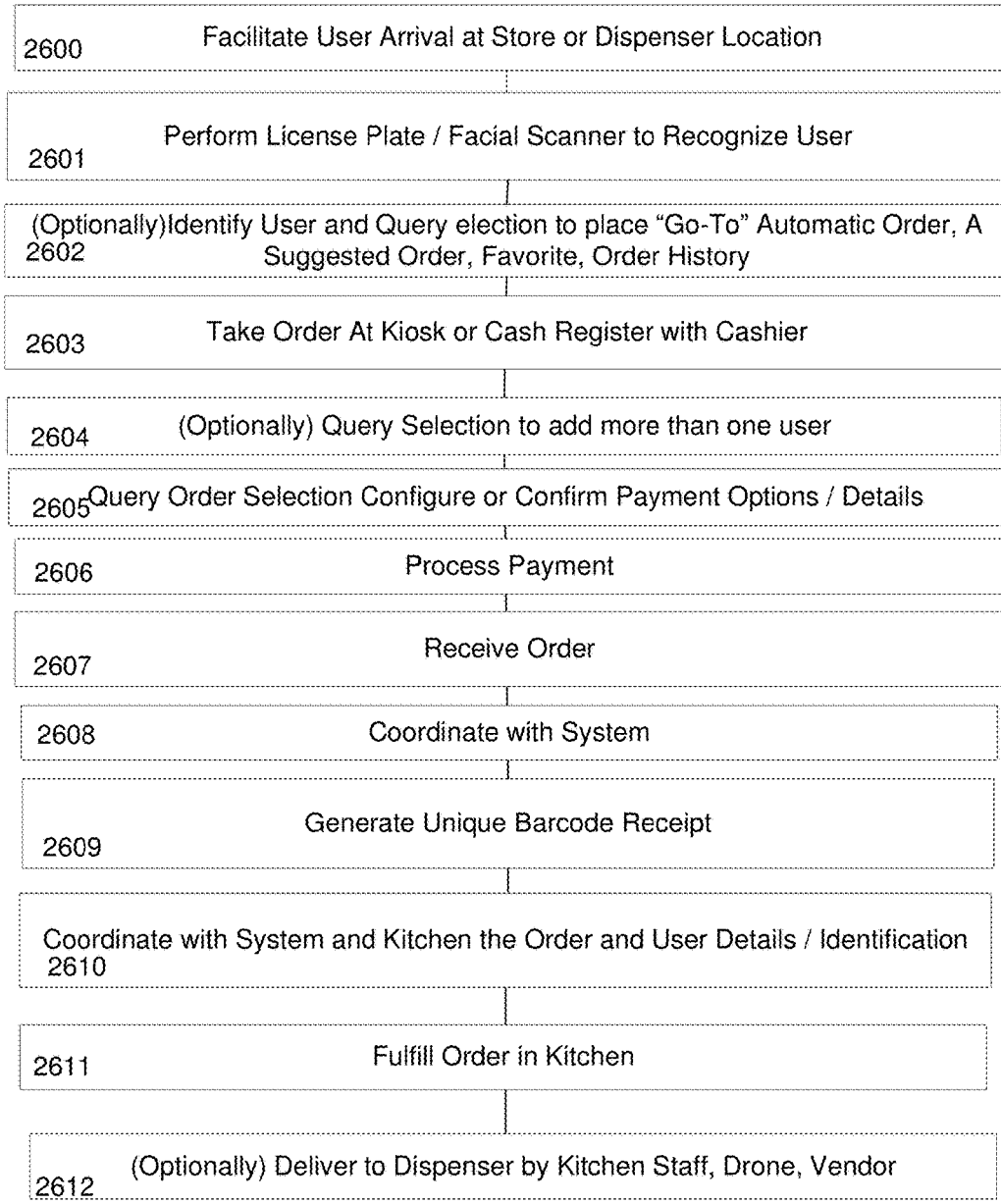
FIGS. 26A-B illustrate operational flows for ordering without the application.
Figure 26B:
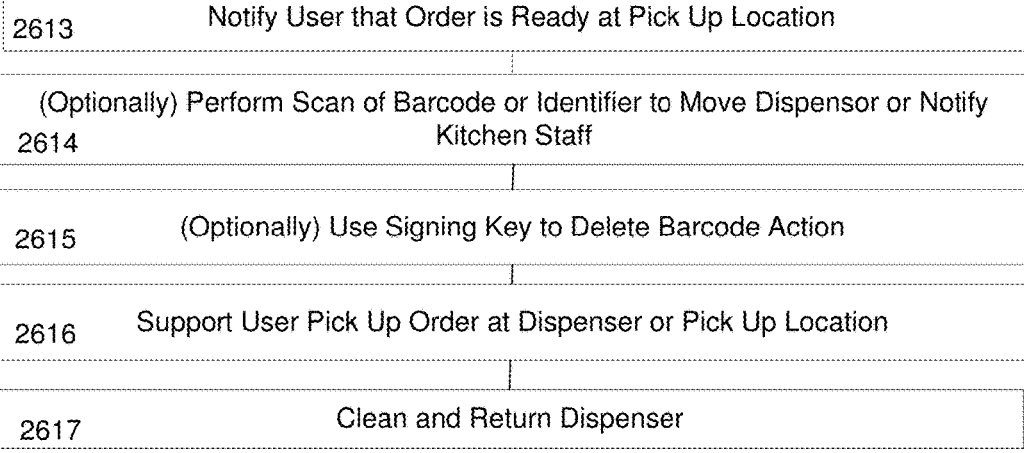

The methods, apparatus, and application software as have been described may be used in some examples to enable ordering and dispensing flows. Referring to FIG. 26A, at step 2600, the system may facilitate a user to arrive at a store or a dispenser location where they may place an order to the system without the use of a mobile device and its application. At step 2601, the system may perform a license plate or facial scan to recognize the user. At step 2602, on recognition of the user, various system functions may optionally be used such as automatic ordering, favorite suggestions, order suggestion, order history and the like. At step 2603, the system may take an order at a kiosk or cash register. At step 2604, the system may optionally ask the user whether they want to invoke a group process as has been defined. At step 2605, the system may confirm the details of the order and payment options. At 2606, the system may be used to process payment. At step 2607, the system may finalize a fully paid order. In some examples, at step 2608 the system may coordinate the user details, the order and the payment details. At step 2609, the system may generate a unique barcode and provide a copy of it to the user in the form of a receipt. At step 2610, the system may coordinate the details of the order with the kitchen. At step 2611, order may be fulfilled in the kitchen. At step 2612, the system may optionally deliver the order via a third party vendor or deliverer. As has been discussed there may be various means to deliver to a dispenser including by staff of the kitchen, through a drone, or through a vendor an order identifier to the user which may in some examples, involve a unique barcode. Referring now to FIG. 26B, at step 2613, the system may be used to notify the user that an order is ready at a pick-up location. At step 2614, the system may optionally scan a barcode or other identifier to move a dispenser location for pick-up. At step 2615, the system may optionally delete the activity of the barcode. At step 2616, the system may support the user to pick-up their order either at a dispenser or a pick-up location. At step 2617, in examples where a dispenser has been used the system may clean a used dispenser and return it into operation. Variations of this specific example are well within the intent of the present disclosure.

Frequency of facial, license plate, or barcode scan at a kiosk or dispenser may be analyzed and provide restaurant activity statistics, order statistics, wait status, or a plurality of other pertinent user or order statistics valuable to a restaurant or user, which may be communicated via the application.

Remote Ordering

The methods, apparatus, and application software as have been described may be used in some examples to enable remote ordering and dispensing flows. Referring to FIG. 27A, at step 2700, the system may receive a request from a user to select a store or a dispenser location to receive an order in the application. There may be various methods to communication such as through scans, on voice command, through app, and the like. At step 2701, the system may optionally facilitate the user to send an order request to other users and combine request. At step 2702, the system may facilitate the user to select their order and to configure or confirm payment options. At step 2703, the system may ready a queue for the order. At step 2704, the various processes may be coordinated by the system. At step 2705, the system may receive an order and subsequently process payment. At step 2706, the system may generate a unique barcode. At step 2707, the system may coordinate with the kitchen for the order and dispensing selections. At step 2708 the order may be fulfilled in the kitchen. At step 2709, the system may optionally deliver the order to a dispenser by the various means as have been discussed. At step 2710, the system may notify the user that the order is ready for pick-up at the designated location. At step 2711, the system may facilitate the user's arrival at the store or dispenser location as selected and coordinate the pick-up of the order. Referring now to FIG. 27B, at step 2712, the system may optionally recognize the user who placed the remote order. In some examples, the recognition may occur with scanning of the user's license plate or with a facial scan of the user. The resulting recognition may cause a dispenser to move a food order into location for pick-up. At step 2713, there may be an optional scan made of a barcode on a receipt or a mobile device of the user in order to cause the dispenser to move to a location for pick-up. At step 2714, the system may optionally delete the barcode. At step 2715, the system may support user pick-up of the order at the dispenser or as appropriate at a conventional pick-up location. And, at step 2716, the system may clean the dispenser and return it to use. In some examples, the cleaning may be performed in a dispenser itself. Variations of this specific example are well within the intent of the present disclosure.

Automatic Ordering

Figure 28A:
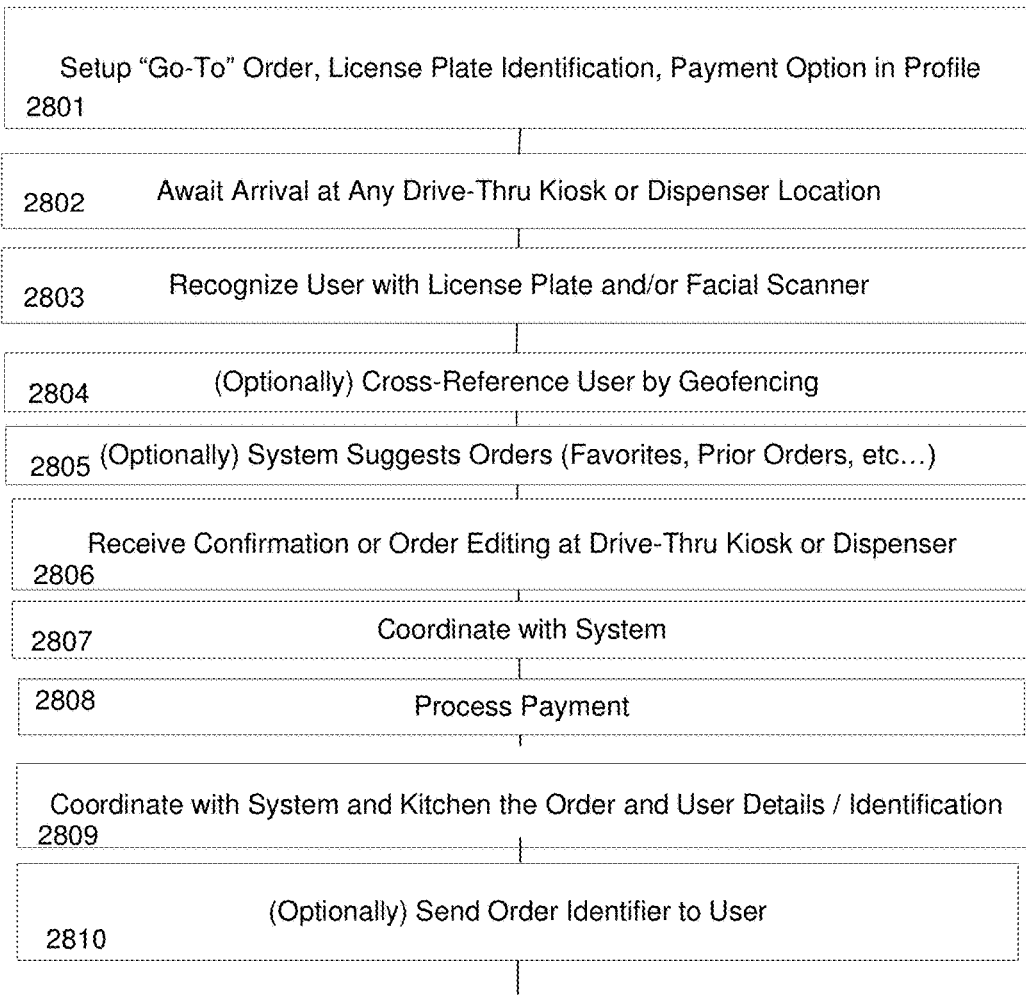
FIGS. 28A-B illustrate operational flows for automatic ordering.
Figure 28B:
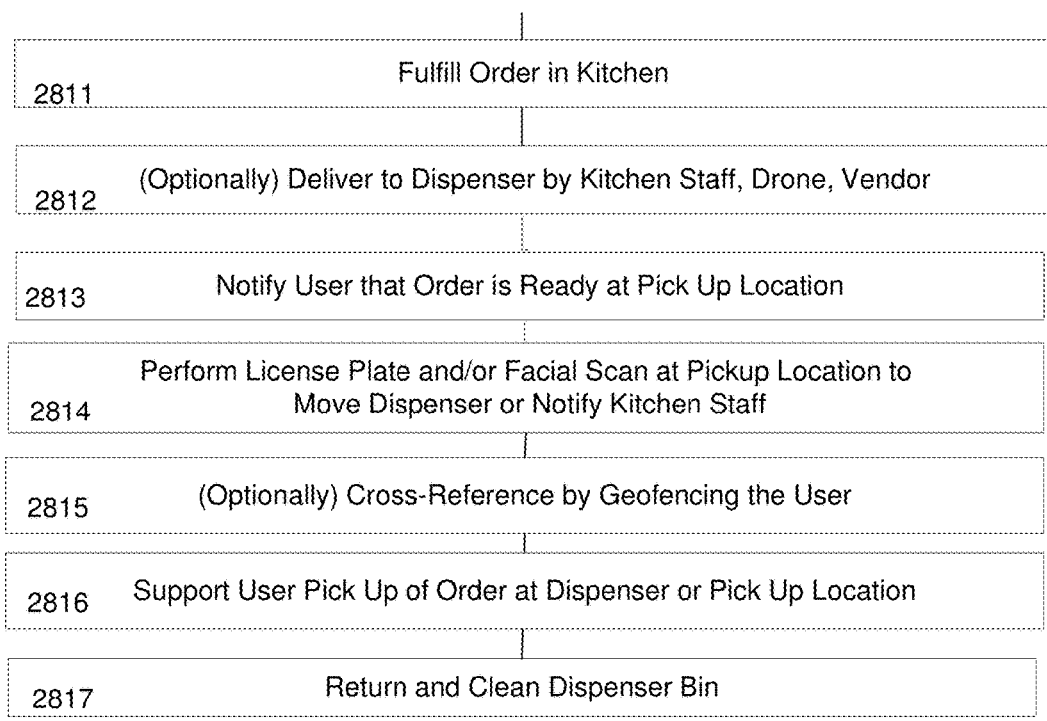

The methods, apparatus, and application software as have been described may be used in some examples to enable automatic ordering and dispensing flows. Referring to FIG. 28A, at step 2801, the system may enable a user to set up various profiles associated with the identification such as "go-to" orders, license plate identification, biometric data, payment options and the like. At step 2802, the system may await arrival at any drive-thru kiosk or dispenser. At step 2803, the system may recognize the user with a facial scan, license plate scan, or combination of both, to ready a queue for the order. At step 2804, the system may optionally cross-reference the user by geofencing and the like. At step 2805, the system may optionally suggest orders to the user such as favorites, prior orders and the like. At step 2806, the system may receive confirmation of an existing order or accept edits to the order at a drive-thru kiosk or at a dispenser. At step 2807, the system control coordination of the various elements related to ordering so that at step 2808 payment may be realized. At step 2809 the system may coordinate the order details with the kitchen. At step 2810, the system may optionally send an order identifier to the user, such as a dispenser code. In some examples, the order identifier may include a barcode image to a mobile device. Referring now to FIG. 28B, at step 2811, the system may coordinate processes of the kitchen to realize the order. At step 2812, the system may optionally coordinate deliver of the order to a dispenser by kitchen staff. At step 2813, the system may notify the user that their order is ready for pick-up. At step 2814, the system may perform a license plate scan or a facial scan at a pick-up location and coordinate the status for pick-up. At step 2815, the system may optionally cross reference the identity of the user using geofencing and the like. At step 2816, the system may support a user to pick-up an order at a dispenser or a pick-up location. In some examples, the support may include scanning a barcode or other identifier of a completed order to move a dispenser location for pick-up. At step 2817, in examples where a dispenser has been used the system may clean a used dispenser and return it into operation. Variations of this specific example are well within the intent of the present disclosure.

Conclusion

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments may also be implemented in combination in a single embodiment. Conversely, various features that are described in the context of a single embodiment may also be implemented in combination in multiple embodiments separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method for delivery of a food product, the method comprising:

receiving into a server comprising a processor and a memory storing executable code from a scanner located on site of a food preparation facility, an encoded unique transaction code comprising encoded information including a user identification, an order description, and a payment status; and based upon receipt of the encoded unique transaction code, remotely operate a dispenser comprising a plurality of bins configured for storage of food items to dispense one or more stored food items;

receiving via wireless transmission a list of a plurality of users which may participate in a group order comprising multiple food items;

transmitting a communication to the plurality of users, wherein the communication offers an ordering session to the plurality of users;

receiving a digital communication comprising respective orders from two or more of the users the respective orders comprising food items;

transmitting a status of the group order to a first user;

placing the food items comprising the group order in one or more designated bins of the dispenser;

communicating a barcode image to the first user, wherein the barcode image comprises information for the user to interact with the dispenser and receive the food items of the group order from the one or more designated bins;

receiving a scan of the barcode from a scanner proximate to the dispenser; and dispensing the food items comprising the group order from the one or more designated bins based upon the receiving of the scan of the barcode.

2. The method of claim 1 wherein the first user utilizes the executable code to provide payment for the plurality of users.

3. The method of claim 1 wherein one of the plurality of users utilizes the executable code for payment of another user.

4. The method of claim 1 wherein a license plate of an automobile of the first user is scanned while the first user drives into proximity to the dispenser, and wherein the scan of the license plate is used to identify an order and customer and activate a function of the dispenser.

5. The method of claim 1 additionally comprising the step of receiving a respective communication for each respective order of the group order, the respective communications comprising a payment modality for each respective order.

6. The method of claim 1 additionally comprising the step of associating each respective food item with a preferred temperature control during storage prior to dispensing of the respective food item.

* * * * *